US009749642B2

(12) United States Patent
Sullivan et al.

(10) Patent No.: US 9,749,642 B2
(45) Date of Patent: Aug. 29, 2017

(54) SELECTION OF MOTION VECTOR PRECISION

(71) Applicant: Microsoft Corporation, Redmond, WA (US)

(72) Inventors: Gary J. Sullivan, Bellevue, WA (US); You Zhou, Sammamish, WA (US); Ming-Chieh Lee, Bellevue, WA (US); Chih-Lung Lin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 14/513,132

(22) Filed: Oct. 13, 2014

(65) Prior Publication Data

US 2015/0195525 A1   Jul. 9, 2015

Related U.S. Application Data

(60) Provisional application No. 61/934,574, filed on Jan. 31, 2014, provisional application No. 61/925,090, filed on Jan. 8, 2014.

(51) Int. Cl.
*H04N 19/174* (2014.01)
*H04N 19/105* (2014.01)
(Continued)

(52) U.S. Cl.
CPC ......... *H04N 19/174* (2014.11); *H04N 19/105* (2014.11); *H04N 19/109* (2014.11);
(Continued)

(58) Field of Classification Search
CPC .. H04N 19/174; H04N 19/105; H04N 19/109; H04N 19/136; H04N 19/139;
(Continued)

(56) References Cited

U.S. PATENT DOCUMENTS 4,661,849 A   4/1987   Hinman
4,661,853 A   4/1987   Roeder et al.
(Continued)

FOREIGN PATENT DOCUMENTS

EP   0535746   4/1993
EP   0863675   9/1998
(Continued)

OTHER PUBLICATIONS

U.S. Appl. No. 60/341,674, filed Dec. 17, 2001, Lee et al.
(Continued)

*Primary Examiner* — William C Vaughn, Jr.
*Assistant Examiner* — Jae N Noh
(74) *Attorney, Agent, or Firm* — Klarquist Sparkman, LLP

(57) ABSTRACT

Approaches to selection of motion vector ("MV") precision during video encoding are presented. These approaches can facilitate compression that is effective in terms of rate-distortion performance and/or computational efficiency. For example, a video encoder determines an MV precision for a unit of video from among multiple MV precisions, which include one or more fractional-sample MV precisions and integer-sample MV precision. The video encoder can identify a set of MV values having a fractional-sample MV precision, then select the MV precision for the unit based at least in part on prevalence of MV values (within the set) having a fractional part of zero. Or, the video encoder can perform rate-distortion analysis, where the rate-distortion analysis is biased towards the integer-sample MV precision. Or, the video encoder can collect information about the video and select the MV precision for the unit based at least in part on the collected information.

20 Claims, 8 Drawing Sheets

(51) Int. Cl.
*H04N 19/17* (2014.01)
*H04N 19/52* (2014.01)
*H04N 19/139* (2014.01)
*H04N 19/147* (2014.01)
*H04N 19/109* (2014.01)
*H04N 19/136* (2014.01)
*H04N 19/177* (2014.01)
*H04N 19/179* (2014.01)
*H04N 19/142* (2014.01)
*H04N 19/513* (2014.01)
*H04N 19/523* (2014.01)

(52) U.S. Cl.
CPC ......... *H04N 19/136* (2014.11); *H04N 19/139* (2014.11); *H04N 19/142* (2014.11); *H04N 19/147* (2014.11); *H04N 19/17* (2014.11); *H04N 19/177* (2014.11); *H04N 19/179* (2014.11); *H04N 19/52* (2014.11); *H04N 19/521* (2014.11); *H04N 19/523* (2014.11)

(58) Field of Classification Search
CPC .... H04N 19/142; H04N 19/147; H04N 19/17; H04N 19/177; H04N 19/179; H04N 19/52; H04N 19/521; H04N 19/523
USPC ..................................................... 375/240.02
See application file for complete search history.

(56) References Cited

U.S. PATENT DOCUMENTS

| | | | |
|---|---|---|---|
| 4,695,882 A | 9/1987 | Wada et al. | |
| 4,862,267 A | 8/1989 | Gillard et al. | |
| 4,864,393 A | 9/1989 | Harradine et al. | |
| 5,103,306 A | 4/1992 | Weiman et al. | |
| 5,175,618 A | 12/1992 | Ueda | |
| 5,298,991 A | 3/1994 | Yagasaki et al. | |
| 5,384,869 A | 1/1995 | Wilkinson et al. | |
| 5,424,779 A | 6/1995 | Odaka | |
| 5,428,396 A | 6/1995 | Yagasaki | |
| 5,442,400 A | 8/1995 | Sun | |
| 5,467,136 A | 11/1995 | Odaka | |
| 5,477,272 A | 12/1995 | Zhang | |
| 5,491,523 A | 2/1996 | Sato | |
| 5,559,557 A | 9/1996 | Kato | |
| 5,565,922 A | 10/1996 | Krause | |
| 5,594,504 A | 1/1997 | Ebrahimi | |
| 5,594,813 A | 1/1997 | Fandrianto et al. | |
| 5,623,311 A | 4/1997 | Phillips et al. | |
| 5,659,365 A | 8/1997 | Wilkinson | |
| 5,692,063 A | 11/1997 | Lee et al. | |
| 5,701,164 A | 12/1997 | Kato | |
| 5,784,175 A | 7/1998 | Lee | |
| 5,787,203 A | 7/1998 | Lee et al. | |
| 5,796,855 A | 8/1998 | Lee | |
| 5,799,113 A | 8/1998 | Lee | |
| 5,825,929 A | 10/1998 | Chen et al. | |
| 5,844,613 A | 12/1998 | Chaddha | |
| 5,847,776 A | 12/1998 | Khmelnitsky | |
| 5,874,995 A | 2/1999 | Naimpally et al. | |
| 5,901,248 A | 5/1999 | Fandrianto et al. | |
| 5,929,940 A | 7/1999 | Jeannin | |
| 5,946,042 A | 8/1999 | Kato | |
| 5,959,673 A | 9/1999 | Lee et al. | |
| 5,963,259 A | 10/1999 | Nakaya et al. | |
| 5,970,173 A | 10/1999 | Lee et al. | |
| 5,973,755 A | 10/1999 | Gabriel | |
| 5,982,438 A | 11/1999 | Lin et al. | |
| 5,991,447 A | 11/1999 | Eifrig et al. | |
| 6,005,980 A | 12/1999 | Eifrig et al. | |
| 6,011,596 A | 1/2000 | Burl | |
| 6,040,863 A | 3/2000 | Kato | |
| 6,058,212 A | 5/2000 | Yokoyama | |
| 6,067,322 A | 5/2000 | Wang | |
| RE36,822 E | 8/2000 | Sugiyama | |
| 6,130,963 A | 10/2000 | Uz et al. | |
| 6,201,927 B1 | 3/2001 | Comer et al. | |
| 6,205,176 B1 | 3/2001 | Sugiyama | |
| 6,219,070 B1 | 4/2001 | Baker et al. | |
| 6,219,464 B1 | 4/2001 | Greggain et al. | |
| 6,233,017 B1 | 5/2001 | Chaddha | |
| RE37,222 E | 6/2001 | Yonemitsu | |
| 6,259,741 B1 | 7/2001 | Chen et al. | |
| 6,266,091 B1 | 7/2001 | Saha et al. | |
| 6,271,885 B2 | 8/2001 | Sugiyama | |
| 6,281,942 B1 | 8/2001 | Wang | |
| 6,282,243 B1 | 8/2001 | Kazui et al. | |
| 6,295,376 B1 | 9/2001 | Nakaya | |
| 6,307,887 B1 | 10/2001 | Gabriel | |
| 6,310,918 B1 | 10/2001 | Saha et al. | |
| 6,320,593 B1 | 11/2001 | Sachs et al. | |
| 6,324,216 B1 | 11/2001 | Igarashi | |
| 6,337,881 B1 | 1/2002 | Chaddha | |
| 6,339,656 B1 | 1/2002 | Marui | |
| 6,377,628 B1 | 4/2002 | Schultz et al. | |
| 6,381,279 B1 | 4/2002 | Taubman | |
| 6,396,876 B1 | 5/2002 | Babonneau et al. | |
| 6,404,813 B1 | 6/2002 | Haskell et al. | |
| 6,418,166 B1 | 7/2002 | Wu et al. | |
| 6,430,316 B1 | 8/2002 | Wilkinson | |
| 6,441,842 B1 | 8/2002 | Fandrianto et al. | |
| 6,496,608 B1 | 12/2002 | Chui | |
| 6,529,632 B1 | 3/2003 | Nakaya et al. | |
| 6,539,056 B1 | 3/2003 | Sato et al. | |
| 6,647,061 B1 | 11/2003 | Panusopone et al. | |
| 6,650,781 B2 | 11/2003 | Nakaya | |
| 6,661,470 B1 | 12/2003 | Kawakami et al. | |
| 6,728,317 B1 | 4/2004 | Demos | |
| 6,765,965 B1 | 7/2004 | Hanami et al. | |
| RE38,563 E | 8/2004 | Eifrig et al. | |
| 6,915,013 B2 * | 7/2005 | Nakaya | H04N 19/52 375/240.16 |
| 6,950,469 B2 | 9/2005 | Karczewicz et al. | |
| 6,968,008 B1 | 11/2005 | Ribas-Corbera et al. | |
| 6,983,018 B1 | 1/2006 | Lin et al. | |
| 7,110,459 B2 | 9/2006 | Srinivasan | |
| 8,130,828 B2 | 3/2012 | Hsu et al. | |
| 8,155,195 B2 | 4/2012 | Regunathan et al. | |
| 2001/0050957 A1 | 12/2001 | Nakaya et al. | |
| 2002/0186890 A1 | 12/2002 | Lee et al. | |
| 2003/0095603 A1 | 5/2003 | Lan et al. | |
| 2003/0112864 A1 | 6/2003 | Karczewicz et al. | |
| 2003/0142748 A1 | 7/2003 | Tourapis et al. | |
| 2003/0152146 A1 | 8/2003 | Lin et al. | |
| 2003/0156646 A1 | 8/2003 | Hsu et al. | |
| 2003/0202705 A1 | 10/2003 | Sun | |
| 2005/0013498 A1 | 1/2005 | Srinivasan | |
| 2005/0036700 A1 | 2/2005 | Nakaya | |
| 2005/0036759 A1 | 2/2005 | Lin et al. | |
| 2005/0220190 A1 | 10/2005 | Ha et al. | |
| 2005/0226335 A1 | 10/2005 | Lee et al. | |
| 2006/0056513 A1 | 3/2006 | Shen et al. | |
| 2006/0056708 A1 | 3/2006 | Shen et al. | |
| 2007/0121728 A1 | 5/2007 | Wang et al. | |
| 2007/0160151 A1 | 7/2007 | Bolton et al. | |
| 2007/0201562 A1 | 8/2007 | Ganesh et al. | |
| 2008/0285642 A1 | 11/2008 | Jahanghir et al. | |
| 2009/0244299 A1 * | 10/2009 | Fukunishi | H04N 5/23248 348/208.4 |
| 2010/0166079 A1 * | 7/2010 | Goel | G11B 27/005 375/240.25 |
| 2011/0194784 A1 | 8/2011 | Laroche et al. | |
| 2011/0255589 A1 | 10/2011 | Saunders et al. | |
| 2012/0008686 A1 * | 1/2012 | Haskell | H04N 19/105 375/240.16 |
| 2012/0093226 A1 | 4/2012 | Chien et al. | |
| 2012/0257679 A1 | 10/2012 | Bankoski et al. | |
| 2012/0320978 A1 | 12/2012 | Ameres et al. | |

(56) References Cited

U.S. PATENT DOCUMENTS

FOREIGN PATENT DOCUMENTS

| EP | 0884912 | 12/1998 |
|---|---|---|
| GB | 2343579 | 5/2000 |
| JP | 3-129986 | 6/1991 |
| JP | 2006-157531 | 6/2006 |
| WO | WO 00/33581 | 6/2000 |
| WO | WO 03/026296 | 3/2003 |
| WO | WO 2013/002716 | 1/2013 |

OTHER PUBLICATIONS

U.S. Appl. No. 60/488,710, filed Jul. 18, 2003, Srinivasan et al.
Bartkowiak et al., "Color Video Compression Based on Chrominance Vector Quantization," *7th International Workshop on Systems, Signals and Image Processing*, pp. 107-110 (2000).
Benzler et al., "Improving multiresolution motion compensating hybrid coding by drift reduction," *Picture Coding Symposium*, 4 pp. (1996).
Benzler et al., "Motion and aliasing compensating prediction with quarter-pel accuracy and adaptive overlapping blocks as proposal for MPEG-4 tool evaluation—Technical description," ISO/IEC JTC1/SC29/WG11, MPEG95/0552, 5 pp. document marked 1995.
Benzler, "Results of core experiment P8 (Motion an Aliasing compensating Prediction)," ISO/IEC JTC1/SC29/WG11, MPEG97/2625, 8 pp., document marked 1997.
Bjontegaard,"H.26L Test Model Long Term No. 5 (TML-5) draft0," q15k59d1.doc, 35 pp. (document marked Oct. 2000).
Borman et al., "Block-matching Sub-pixel Motion Estimation from Noisy, Under-Sampled Frames—an Empirical Performance Evaluation," *SPIE Visual Communications and Image Processing*, 10 pp. (1999).
Conklin et al., "Multi-resolution Motion Estimation," *Proc. ICASSP '97*,Munich, Germany, 4 pp. (1997).
de Haan et al., "Sub-pixel motion estimation with 3-D recursive search block-matching," *Signal Processing: Image Communication 6*, pp. 229-239 (1994).
"DivX Multi Standard Video Encoder," 2 pp. (Downloaded from the World Wide Web on Jan. 24, 2006).
Ebrahimi, "MPEG-4 Video Verification Model Version 10.0," ISO/IEC JTC1/SC29/WG11, MPEG98/N1992, pp. 1, 43-52, 72-74, 123-130, and 190, document marked 1998.
Ericsson, "Fixed and Adaptive Predictors for Hybrid Predictive/Transform Coding," *IEEE Transactions on Communications*, vol. COM-33, No. 12, pp. 1291-1302 (1985).
Flierl et al., "Multihypothesis Motion Estimation for Video Coding," *Proc. DCC*, pp. 1-10 (Mar. 2001).
Girod, "Efficiency Analysis of Multihypothesis Motion-Compensated Prediction for Video Coding," *IEEE Transactions on Image Processing*, vol. 9, No. 2, pp. 173-183 (Feb. 2000).
Horn et al., "Estimation of motion vector fields for multiscale motion compensation," *Proceedings Picture Coding Symposium (PCS 97)*, pp. 141-144 (Sep. 1997).
International Preliminary Report on Patentability dated Apr. 21, 2016, from International Patent Application No. PCT/US2014/071332, 13 pp.
ITU—Q15-F-24, "MVC Video Codec—Proposal for H.26L," Study Group 16, Video Coding Experts Group (Question 15), 28 pp. (1998).
Iwahashi et al., "A Motion Compensation Technique for Downscaled Pictures in Layered Coding," *IEICE Transactions on Comm.*, vol. E77-B, No. 8, pp. 1007-1012 (Aug. 1994).
Joint Video Team (JVT) of ISO/IEC MPEG & ITU-T VCEG, "Joint Final Committee Draft (JFCD) of Joint Video Specification," JVT-D157, 207 pp. (Aug. 2002).
Keys, "Cubic Convolution Interpolation for Digital Image Processing," *IEEE Transactions on Acoustics, Speech, and Signal Processing*, vol. ASSP-29, No. 6, pp. 1153-1160 (1981).

Konrad et al., "On Motion Modeling and Estimation for Very Low Bit Rate Video Coding," *Visual Communications and Image Processing VCIP '95*, 12 pp. (May 23-26, 1995).
Microsoft Corporation, "Microsoft Debuts New Windows Media Player 9 Series, Redefining Digital Media on the PC," 4 pp. (Sep. 4, 2002) [Downloaded from the World Wide Web on May 14, 2004].
Mook, "Next-Gen Windows Media Player Leaks to the Web," *BetaNews*, 17 pp. (Jul. 2002) [Downloaded from the World Wide Web on Aug. 8, 2003].
Morimoto et al., "Fast Electronic Digital Image Stabilization," *Proc. ICPR*, Vienna, Austria, 5 pp. (1996).
"Overview of MPEG-2 Test Model 5," 5 pp., downloaded from http://ww.mpeg.org/MSSG/tm5/Overview.html on Jan. 12, 2006.
Printouts of FTP directories from http://ftp3.itu.ch, 8 pp. (Downloaded from the World Wide Web on Sep. 20, 2005).
Reader, "History of MPEG Video Compression—Ver. 4.0," 99 pp., document marked Dec. 16, 2003.
Ribas-Corbera et al., "On the Optimal Block Size for Block-based Motion-Compensated Video Coders," *SPIE Proc. Of Visual Communications and Image Processing*, vol. 3024, 12 pp. (1997).
Schultz et al., "Subpixel Motion Estimation for Super-Resolution Image Sequence Enhancement," *Journal of Visual Communication and Image Representation*, vol. 9, No. 1, pp. 38-50 (Mar. 1998).
Sullivan et al., "The H.264/AVC Advanced Video Coding Standard: Overview and Introduction to the Fidelity Range Extensions," 21 pp. (Aug. 2004).
"The TML Project WEB-Page and Archive," (including pages of code marked "image.cpp for H.26L decoder, Copyright 1999" and "image.c"), 24 pp., downloaded from http://www.stewe.org/vceg.org/archive.htm on Jun. 1, 2005.
Triggs, "Empirical Filter Estimation for Subpixel Interpolation and Matching," Int'l Conf. Computer Vision '01, Vancouver, Canada, Jul. 9-12, 2001, 8 pp. (2001).
Triggs, "Optimal Filters for Subpixel Interpolation and Matching," *Int'l Conf. Computer Vision '01*, Vancouver, Canada, Jul. 9-12, 2001, 10 pp. (2001).
"Video Coding Using Wavelet Decomposition for Very Low Bit-rate Networks," 16 pp. (1997).
Wedi, "Complexity Reduced Motion Compensated Prediction with 1/8-pel Displacement Vector Resolution," ITU—VCEG-L20, Study Group 16, Video Coding Experts Group (Question 6), 8 pp. (document marked Dec. 2000).
Weiss et al., "Real Time Implementation of Subpixel Motion Estimation for Broadcast Applications," pp. Jul. 1-Jul. 3, 1990.
Wiegand, "Joint Model No. 1, Revision 1 (JM1-rl)," JVT-A003R1, 80 pp. (document marked "Generated: Jan. 18, 2002").
Wien, "Variable Block-Size Transforms for Hybrid Video Coding," Dissertation, 182 pp. (Feb. 2004).
Yang et al., "Very High Efficiency VLSI Chip-Pair for Full Search Block Matching with Fractional Precision," *Proc. ICASSP, IEEE Int'l Conf. on Accoustics, Speech and Signal Processing*, Glasgow, pp. 2437-2440 (May 1989).
Yu et al., "Two-Dimensional Motion Vector Coding for Low Bitrate Videophone Applications," *Proc. Int'l Conf. on Image Processing*, Los Alamitos, US, pp. 414-417, IEEE Comp. Soc. Press (1995).
Davis et al., "Equivalence of Subpixel Motion Estimators Based on Optical Flow and Block Matching," Proc. IEEE Int'l Symposium on Computer Vision, pp. 7-12 (Nov. 1995).
Girod, "Motion-Compensating Prediction with Fractional-Pel Accuracy," *IEEE Transactions on Comm.*, vol. 41, No. 4, pp. 604-612 (Apr. 1993).
Girod, "Motion Compensation: Visual Aspects, Accuracy, and Fundamental Limits," *Motion Analysis and Image Sequence Processing*, Kluwer Academic Publishers, pp. 125-152 (1993).
Guo et al., "Adaptive Motion Vector Resolution with Implicit Signaling," *IEEE Int'l Conf. on Image Processing*, pp. 2057-2060 (Sep. 2010).
Kossentini et al., "Predictive RD Optimized Motion Estimation for Very Low Bit-rate Video Coding," *IEEE J. on Selected Areas in Communications*, vol. 15, No. 9 pp. 1752-1763 (Dec. 1997).

(56) References Cited

OTHER PUBLICATIONS

Lopes et al., "Analysis of Spatial Transform Motion Estimation with Overlapped Compensation and Fractional-pixel Accuracy," *IEEE Proc. Visual Image Signal Processing*, vol. 146, No. 6, pp. 339-344 (Dec. 1999).

Ribas-Corbera et al., "On the Optimal Motion Vector Accuracy for Block-based Motion-Compensated Video Coders," *Proc. SPIE Digital Video Compression*, San Jose, CA, 13 pp. (Mar. 1996).

Wang et al., "Motion Estimation and Mode Decision for Low-Complexity H.264 Decoder," *IEEE Int'l Conf. on Acoustics, Speech, and Signal Processing*, 25 pp. (Apr. 2005).

An et al., "Progressive MV Resolution," JCTVC-F125, 14 pp. (Jul. 2011).

Bankoski et al., "VP8 Data Format and Decoding Guide," RFC 6386, 304 pp. (Nov. 2011).

International Search Report and Written Opinion dated Jun. 30, 2015, from International Patent Application No. PCT/US2014/071332, 18 pp.

ISO/IEC 11172-2, "Information technology—Coding of moving pictures and associated audio for digital storage media at up to about 1,5 Mbit/s—Part 2: Video," 122 pp. (Aug. 1993).

ISO/IEC 14496-2, "Information Technology—Coding of Audio-Visual Objects: Visual," ISO/IEC JTC1/SC29/WG11 N2202, 327 pp. (Mar. 1998).

ITU-T Recommendation H.261, "Video Codec for Audiovisual Services at $p \times 64$ kbits," 29 pp. (Mar. 1993).

ITU-T Recommendation H.262, "Generic Coding of Moving Pictures and Associated Audio Information: Video," 218 pp. (Jul. 1995).

ITU-T Recommendation H.263, "Video coding for low bit rate communication," 167 pp. (Feb. 1998).

ITU-T Recommendation H.264, "Advanced video coding for generic audiovisual services," 680 pp. (Jan. 2012).

ITU-T Recommendation H.265, "High efficiency video coding," 317 pp. (Apr. 2013).

Laroche et al., "Non-RCE1: On MV resolution and motion vector predictor number," JCTVC-Q0067, 5 pp. (Mar. 2014).

Li et al., "Adaptive MV precision for Screen Content Coding," JCTVC-P0283, 3 pp. (Jan. 2014).

Rosewarne et al., "BoG report on Range Extensions," JCTVC-P0288, 16 pp. (Jan. 2014).

SMPTE Standard, "VC-1 Compressed Video Bitstream Format and Decoding Process," SMPTE 421M-2006, 493 pp. (Feb. 2006).

Written Opinion of the International Preliminary Examining Authority dated Feb. 4, 2016, from International Patent Application No. PCT/US2014/071332, 5 pp.

Zhou et al., "Motion Vector Resolution Control for Screen Content Coding," JCTVC-P0277, 5 pp. (Jan. 2014).

Zhou et al., "RCE1: Subtest 1—Motion Vector Resolution Control," JCTVC-Q0155, 5 pp. (Mar. 2014).

\* cited by examiner software 180 implementing one or more innovations for selection of MV precision

400 computer desktop environment (510) with content that may provide input for screen capture composite video (620) with natural video content and palette-based content picture 1000 analyzed by video encoder

SELECTION OF MOTION VECTOR PRECISION

RELATED APPLICATION INFORMATION

The present application claims the benefit of U.S. Provisional Patent Application No. 61/925,090, filed Jan. 8, 2014, the disclosure of which is hereby incorporated by reference. The present application also claims the benefit of U.S. Provisional Patent Application No. 61/934,574, filed Jan. 31, 2014, the disclosure of which is hereby incorporated by reference.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263 and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the HEVC standard (ITU-T H.265 or ISO/IEC 23008-2) has been approved. Extensions to the HEVC standard (e.g., for scalable video coding/decoding, for coding/decoding of video with higher fidelity in terms of sample bit depth or chroma sampling rate, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

In general, video compression techniques include "intra-picture" compression and "inter-picture" compression. Intra-picture compression techniques compress individual pictures, and inter-picture compression techniques compress pictures with reference to a preceding and/or following picture (often called a reference or anchor picture) or pictures.

Inter-picture compression techniques often use motion estimation and motion compensation to reduce bit rate by exploiting temporal redundancy in a video sequence. Motion estimation is a process for estimating motion between pictures. In one common technique, an encoder using motion estimation attempts to match a current block of sample values in a current picture with a candidate block of the same size in a search area in another picture, the reference picture. When the encoder finds an exact or "close enough" match in the search area in the reference picture, the encoder parameterizes the change in position between the current and candidate blocks as motion data (such as a motion vector ("MV")). An MV is conventionally a two-dimensional value, having a horizontal MV component that indicates left or right spatial displacement and a vertical MV component that indicates up or down spatial displacement. In general, motion compensation is a process of reconstructing pictures from reference picture(s) using motion data.

An MV can indicate a spatial displacement in terms of an integer number of sample grid positions starting from a co-located position in a reference picture for a current block. For example, for a current block at position (32, 16) in a current picture, the MV (−3, 1) indicates position (29, 17) in the reference picture. Or, an MV can indicate a spatial displacement in terms of a fractional number of sample grid positions from a co-located position in a reference picture for a current block. For example, for a current block at position (32, 16) in a current picture, the MV (−3.5, 1.25) indicates position (28.5, 17.25) in the reference picture. To determine sample values at fractional offsets in the reference picture, the encoder typically interpolates between sample values at integer-sample positions. Such interpolation can be computationally intensive. During motion compensation, a decoder also performs the interpolation as needed to compute sample values at fractional offsets in reference pictures.

Different video codec standards and formats have used MVs with different MV precisions. For integer-sample MV precision, an MV component indicates an integer number of sample grid positions for spatial displacement. For a fractional-sample MV precision such as ½-sample MV precision or ¼-sample MV precision, an MV component can indicate an integer number of sample grid positions or fractional number of sample grid positions for spatial displacement. For example, if the MV precision is ¼-sample MV precision, an MV component can indicate a spatial displacement of 0 samples, 0.25 samples, 0.5 samples, 0.75 samples, 1.0 samples, 1.25 samples, and so on. Some video codec standards and formats support switching of MV precision during encoding. Encoder-side decisions about which MV precision to use are not made effectively, however, in certain encoding scenarios.

SUMMARY

In summary, the detailed description presents innovations in encoder-side operations for selection of motion vector ("MV") precision. For example, when a video encoder encodes video, the video encoder determines an MV precision for a unit of the video.

According to one aspect of the innovations described herein, when it determines the MV precision for the unit, the video encoder can identify a set of MV values having a fractional-sample MV precision. The video encoder can select the MV precision for the unit based at least in part on prevalence, within the set of MV values, of MV values having a fractional part of zero.

According to another aspect of the innovations described herein, when it determines the MV precision for the unit, the video encoder can perform rate-distortion analysis to decide between multiple MV precisions, which include one or more fractional-sample MV precisions and integer-sample MV precision. The rate-distortion analysis is biased towards the integer-sample MV precision by: (a) scaling a distortion cost, (b) adding a penalty to the distortion cost, (c) scaling a bit rate cost, (d) adding a penalty to the bit rate cost, and/or (e) adjusting a Lagrangian multiplier factor.

According to another aspect of the innovations described herein, when it determines the MV precision for the unit, the video encoder can collect information about the video and select the MV precision for the unit, from among multiple MV precisions, based at least in part on the collected information. The multiple MV precisions include one or more fractional-sample MV precisions and integer-sample MV precision.

The innovations for encoder-side options for selection of MV precision can be implemented as part of a method, as part of a computing device adapted to perform the method or as part of a tangible computer-readable media storing computer-executable instructions for causing a computing device to perform the method. The various innovations can be used in combination or separately.

The foregoing and other objects, features, and advantages of the invention will become more apparent from the following detailed description, which proceeds with reference to the accompanying figures.

DETAILED DESCRIPTION

The detailed description presents innovations in the selection of motion vector ("MV") precision during encoding. These approaches can facilitate compression that is effective in terms of rate-distortion performance and/or computational efficiency. For example, a video encoder determines an MV precision for a unit of video from among multiple MV precisions, which include one or more fractional-sample MV precisions and integer-sample MV precision. The video encoder can identify a set of MV values having a fractional-sample MV precision, then select the MV precision for the unit based at least in part on prevalence of MV values (within the set) having a fractional part of zero. Or, the video encoder can perform rate-distortion analysis, where the rate-distortion analysis is biased towards the integer-sample MV precision. Or, the video encoder can collect information about the video and select the MV precision for the unit based at least in part on the collected information. Or, the video encoder can determine the MV precision for a unit of video in some other way.

Although operations described herein are in places described as being performed by a video encoder, in many cases the operations can be performed by another type of media processing tool.

Some of the innovations described herein are illustrated with reference to syntax elements and operations specific to the HEVC standard. The innovations described herein can also be implemented for other standards or formats.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

Figure 1:
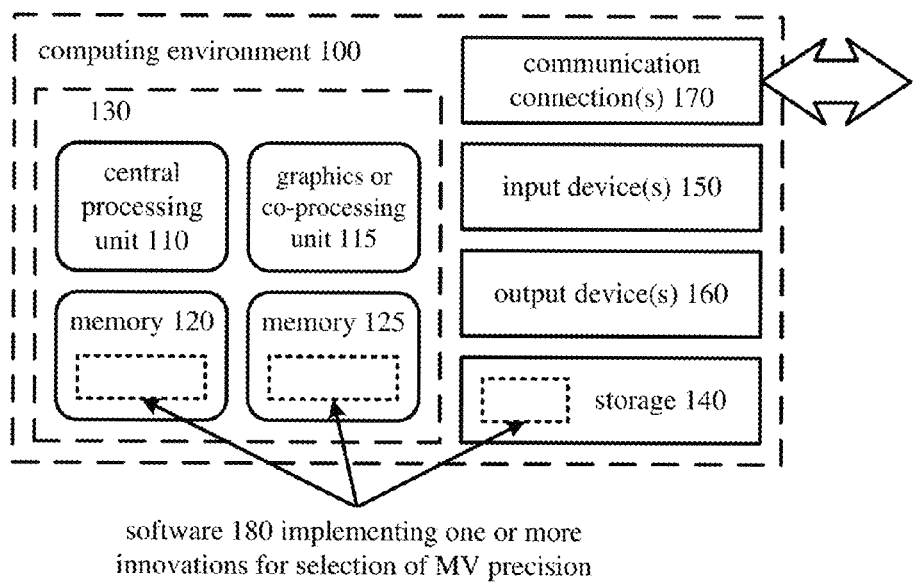
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in various computing systems, including special-purpose computing systems adapted for video encoding.

With reference to FIG. 1, the computing system (100) includes one or more processing units (110, 115) and memory (120, 125). The processing units (110, 115) execute computer-executable instructions. A processing unit can be a central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for selection of MV precision during encoding, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for selection of MV precision during encoding.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, screen capture module, or similar device that accepts video input in analog or digital form, or a CD-ROM or CD-RW that reads video input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a graphics processing unit ("GPU"), or a programmable logic device ("PLD") such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation. As used herein, the term "optimiz*" (including variations such as optimization and optimizing) refers to a choice among options under a given scope of decision, and does not imply that an optimized choice is the "best" or "optimum" choice for an expanded scope of decisions.

II. Example Network Environments.

Figure 2A:
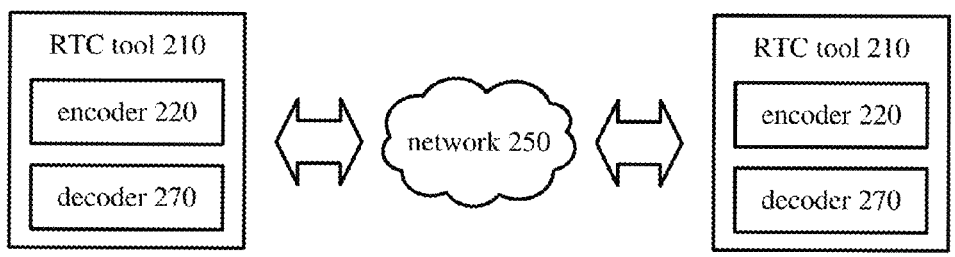
FIGS. 2a and 2b are diagrams of example network environments in which some described embodiments can be implemented.
Figure 2B:

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the HEVC standard (also known as H.265), SMPTE 421M standard, ISO/IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party or multi-party communication scenario. Although the network environment (201) in FIG. 2a includes two real-time communication tools (210), the network environment (201) can instead include three or more real-time communication tools (210) that participate in multi-party communication.

Figure 3:
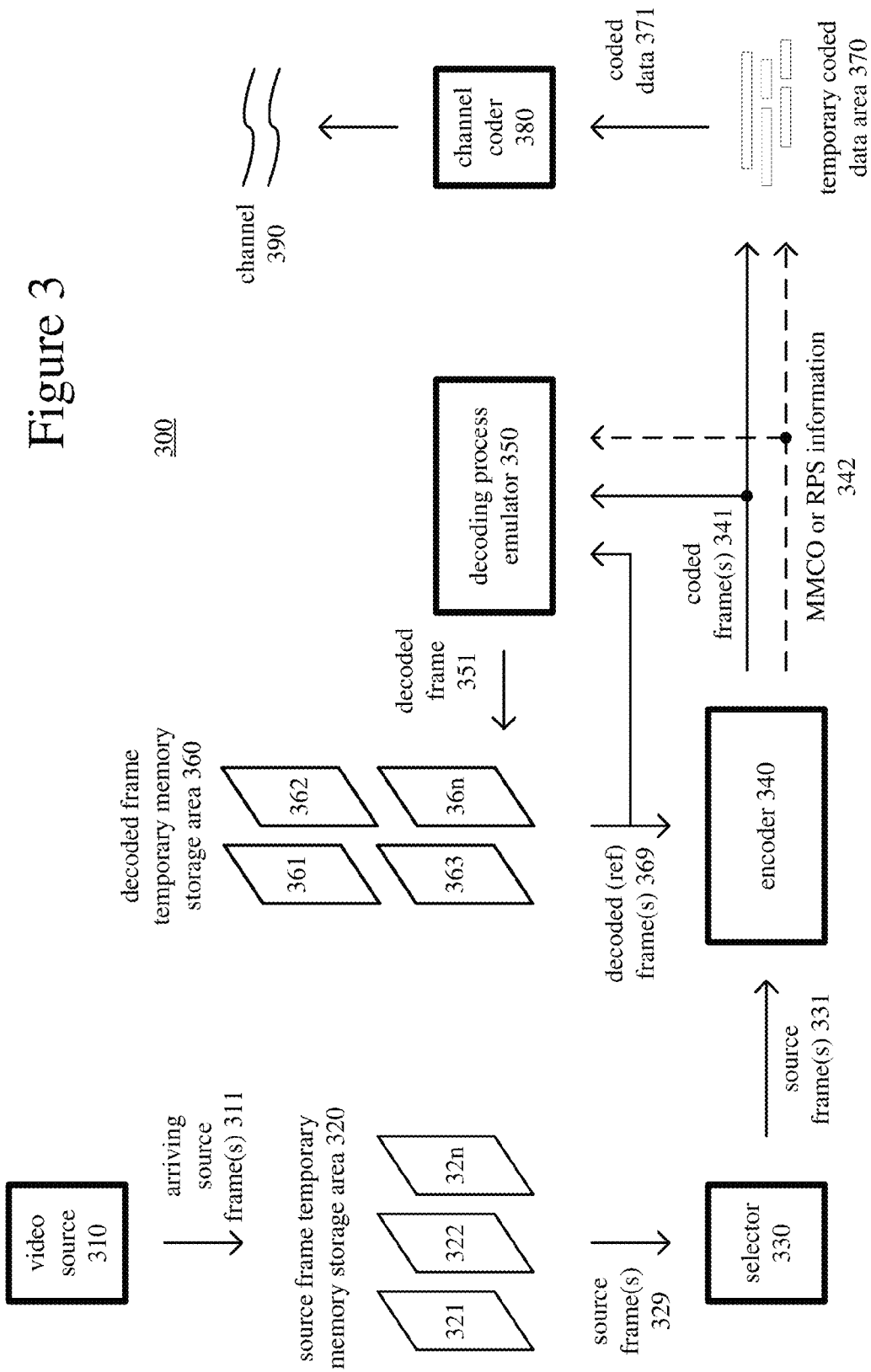
FIG. 3 is a diagram of an example encoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270).

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, screen capture module, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). A playback tool (214) can also include client-side controller logic for managing connections with the encoding tool (212).

III. Example Encoder Systems.

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include content encoded using a selected MV precision.

The video source (310) can be a camera, tuner card, storage media, screen capture module, or other digital video source. The video source (310) produces a sequence of video frames at a frame rate of, for example, 30 frames per second. As used herein, the term "frame" generally refers to source, coded or reconstructed image data. For progressive-scan video, a frame is a progressive-scan video frame. For interlaced video, in example embodiments, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "frame" or "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) selects an individual source frame from the source frame storage area (320). The order in which frames are selected by the frame selector (330) for input to the encoder (340) may differ from the order in which the frames are produced by the video source (310), e.g., the encoding of some frames may be delayed in order, so as to allow some later frames to be encoded first and to thus facilitate temporally backward prediction. Before the encoder (340), the encoder system (300) can include a pre-processor (not shown) that performs pre-processing (e.g., filtering) of the selected frame (331) before encoding. The pre-processing can include color space conversion into primary (e.g., luma) and secondary (e.g., chroma differences toward red and toward blue) components and resampling processing (e.g., to reduce the spatial resolution of chroma components) for encoding. Typically, before encoding, video has been converted to a color space such as YUV, in which sample values of a luma (Y) component represent brightness or intensity values, and sample values of chroma (U, V) components represent color-difference values. The chroma sample values may be sub-sampled to a lower chroma sampling rate (e.g., for YUV 4:2:0 format or YUV 4:2:2), or the chroma sample values may have the same resolution as the luma sample values (e.g., for YUV 4:4:4 format). In YUV 4:2:0 format, chroma components are downsampled by a factor of two horizontally and by a factor of two vertically. In YUV 4:2:2 format, chroma components are downsampled by a factor of two horizontally. Or, the video can be encoded in another format (e.g., RGB 4:4:4 format).

The encoder (340) encodes the selected frame (331) to produce a coded frame (341) and also produces memory management control operation ("MMCO") signals (342) or reference picture set ("RPS") information. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). The MMCO/RPS information (342) indicates to a decoder which reconstructed frames may be used as reference frames, and hence should be stored in a frame storage area.

Generally, the encoder (340) includes multiple encoding modules that perform encoding tasks such as partitioning into tiles, intra prediction estimation and prediction, motion estimation and compensation, frequency transforms, quantization and entropy coding. The exact operations performed by the encoder (340) can vary depending on compression format. The format of the output encoded data can be a variation or extension of HEVC format (H.265), Windows Media Video format, VC-1 format, MPEG-x format (e.g., MPEG-1, MPEG-2, or MPEG-4), H.26x format (e.g., H.261, H.262, H.263, H.264), or another format.

The encoder (340) can partition a frame into multiple tiles of the same size or different sizes. For example, the encoder (340) splits the frame along tile rows and tile columns that, with frame boundaries, define horizontal and vertical boundaries of tiles within the frame, where each tile is a rectangular region. Tiles are often used to provide options for parallel processing. A frame can also be organized as one or more slices, where a slice can be an entire frame or region of the frame. A slice can be decoded independently of other slices in a frame, which improves error resilience. The content of a slice or tile is further partitioned into blocks or other sets of samples for purposes of encoding and decoding.

For syntax according to the HEVC standard, the encoder splits the content of a frame (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder. A luma CTB can contain, for example, 64×64, 32×32 or 16×16 luma sample values. A CTU includes one or more coding units. A coding unit ("CU") has a luma coding block ("CB") and two corresponding chroma CBs. For example, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. For an intra-predicted CU, the PU has the same size as the CU, unless the CU has the smallest size (e.g., 8×8). In that case, the CU can be split into four smaller PUs (e.g., each 4×4 if the smallest CU size is 8×8) or the PU can have the smallest CU size, as indicated by a syntax element for the CU. A CU also has one or more transform units for purposes of residual coding/decoding, where a transform unit ("TU") has a luma transform block ("TB") and two chroma TBs. A PU in an intra-predicted CU may contain a single TU (equal in size to the PU) or multiple TUs. The encoder decides how to partition video into CTUs, CUs, PUs, TUs, etc. In the context of the H.264/AVC standard, the term "macroblock" indicates a block-shaped region similar to that of a CTU for the H.265/HEVC standard, and the term "sub-macroblock partition" indicates a block-shaped region similar to that of a CU or PU. As used herein, the term "block" can indicate a CB, PB, TB, CTU, CU, PU, TU, macroblock, sub-macroblock partition or other set of sample values, depending on context.

Returning to FIG. 3, the encoder represents an intra-coded block of a source frame (331) in terms of prediction from other, previously reconstructed sample values in the frame (331). For intra block copy ("BC") prediction, an intra-picture estimator estimates displacement of a block with respect to the other, previously reconstructed sample values. An intra-frame prediction reference region (or intra-prediction region, for short) is a region of samples in the frame that are used to generate BC-prediction values for the block. The intra-frame prediction region can be indicated with a block vector ("BV") value (determined in BV estimation). For intra spatial prediction for a block, the intra-picture estimator estimates extrapolation of the neighboring reconstructed sample values into the block. The intra-picture estimator can output prediction information (such as BV values for intra BC prediction or prediction mode (direction) for intra spatial prediction), which is entropy coded. An intra-frame prediction predictor applies the prediction information to determine intra prediction values.

The encoder (340) represents an inter-frame coded, predicted block of a source frame (331) in terms of prediction from reference frames. A motion estimator estimates the motion of the block with respect to one or more reference frames (369). The motion estimator can select a motion vector ("MV") precision (e.g., integer-sample MV precision, ½-sample MV precision, or ¼-sample MV precision) as described herein, then use the selected MV precision during motion estimation. When multiple reference frames are used, the multiple reference frames can be from different temporal directions or the same temporal direction. A motion-compensated prediction reference region is a region of samples in the reference frame(s) that are used to generate motion-compensated prediction values for a block of samples of a current frame. The motion estimator outputs motion information such as MV information, which is entropy coded. A motion compensator applies MV values having the selected MV precision to reference frames (369) to determine motion-compensated prediction values for inter-frame prediction.

The encoder can determine the differences (if any) between a block's prediction values (intra or inter) and corresponding original values. These prediction residual values are further encoded using a frequency transform (if the frequency transform is not skipped), quantization and entropy encoding. For example, the encoder (340) sets values for quantization parameter ("QP") for a picture, tile, slice and/or other portion of video, and quantizes transform coefficients accordingly. The entropy coder of the encoder (340) compresses quantized transform coefficient values as well as certain side information (e.g., MV information, selected MV precision, BV values, QP values, mode decisions, parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique. In some implementations, the frequency transform can be skipped. In this case, prediction residual values can be quantized and entropy coded.

An adaptive deblocking filter is included within the motion compensation loop (that is, "in-loop" filtering) in the encoder (340) to smooth discontinuities across block boundary rows and/or columns in a decoded frame. Other filtering (such as de-ringing filtering, adaptive loop filtering ("ALF"), or sample-adaptive offset ("SAO") filtering; not shown) can alternatively or additionally be applied as in-loop filtering operations.

The coded frames (341) and MMCO/RPS information (342) (or information equivalent to the MMCO/RPS information (342), since the dependencies and ordering structures for frames are already known at the encoder (340)) are processed by a decoding process emulator (350). The decoding process emulator (350) implements some of the functionality of a decoder, for example, decoding tasks to reconstruct reference frames. In a manner consistent with the MMCO/RPS information (342), the decoding process emulator (350) determines whether a given coded frame (341) needs to be reconstructed and stored for use as a reference frame in inter-frame prediction of subsequent frames to be encoded. If a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , 36n). In a manner consistent with the MMCO/RPS information (342), the decoding process emulator (350) manages the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

IV. Example Video Encoders.

Figure 4A:
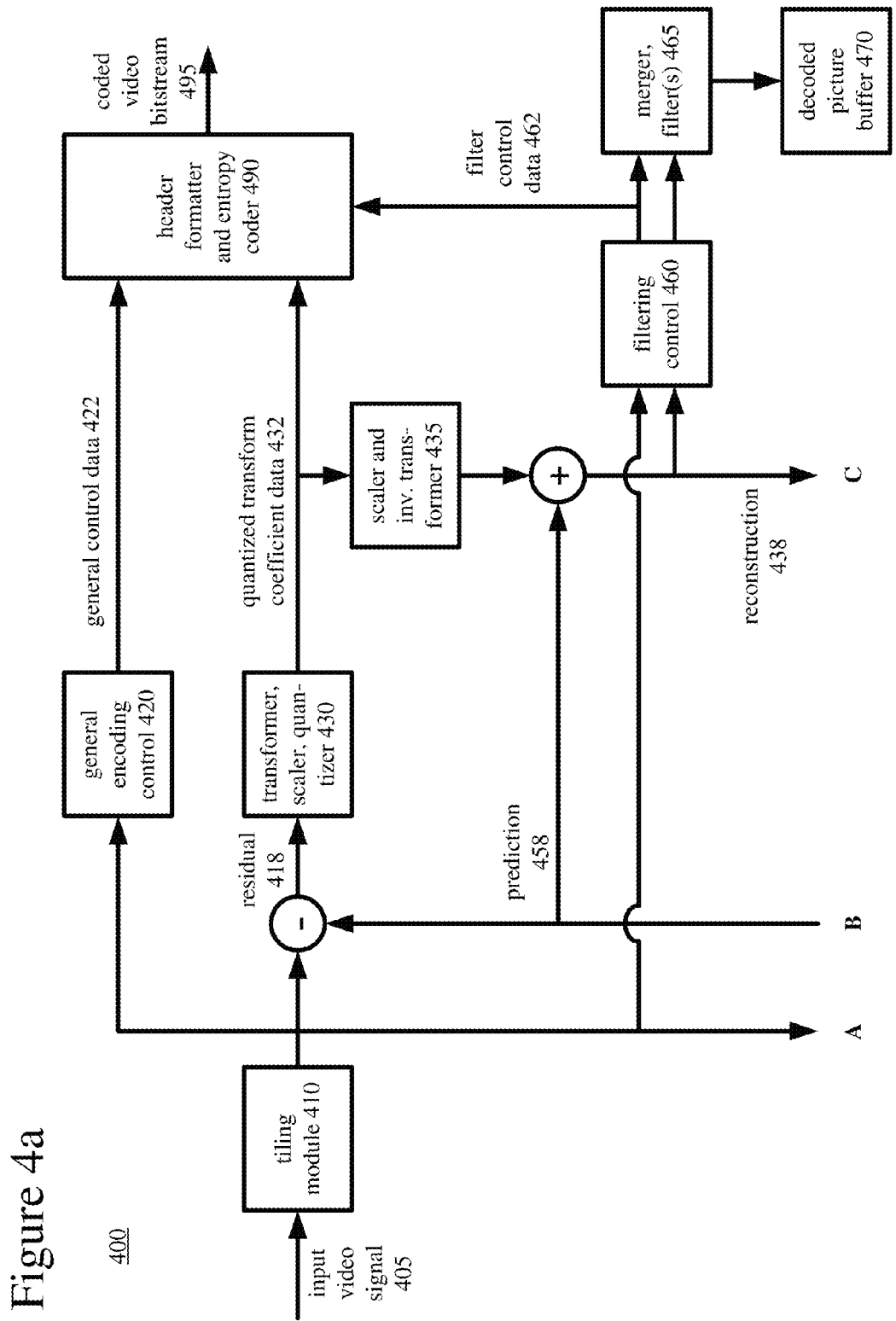
FIGS. 4a and 4b are diagrams illustrating an example video encoder in conjunction with which some described embodiments can be implemented.
Figure 4B:
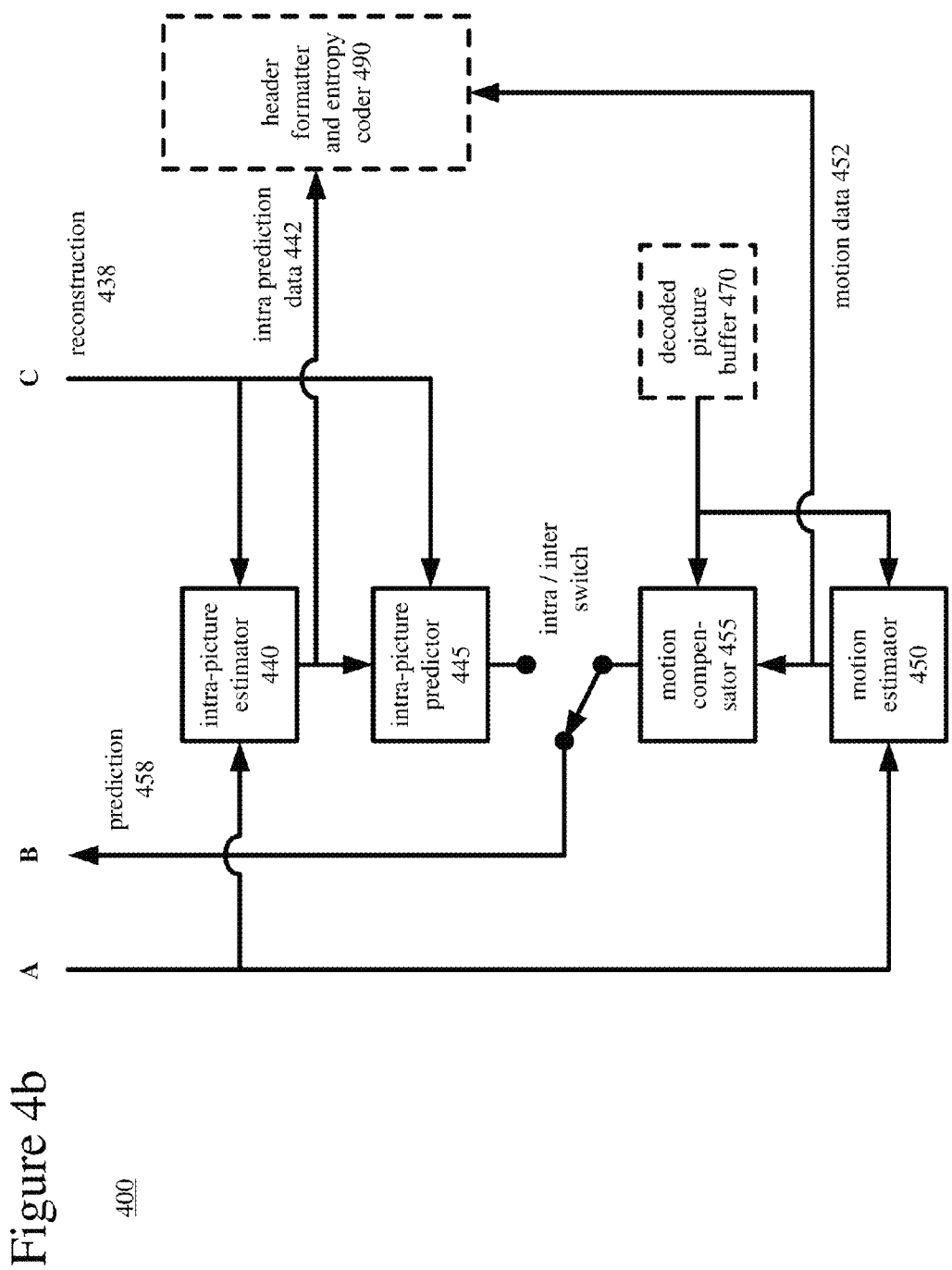

FIGS. 4a and 4b are a block diagram of a generalized video encoder (400) in conjunction with which some described embodiments may be implemented. The encoder (400) receives a sequence of video pictures including a current picture as an input video signal (405) and produces encoded data in a coded video bitstream (495) as output.

The encoder (400) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the HEVC standard, the encoder partitions a picture into CTUs (CTBs), CUs (CBs), PUs (PBs) and TU (TBs).

The encoder (400) compresses pictures using intra-picture coding and/or inter-picture coding. Many of the components of the encoder (400) are used for both intra-picture coding and inter-picture coding. The exact operations performed by those components can vary depending on the type of information being compressed.

A tiling module (410) optionally partitions a picture into multiple tiles of the same size or different sizes. For example, the tiling module (410) splits the picture along tile rows and tile columns that, with picture boundaries, define horizontal and vertical boundaries of tiles within the picture, where each tile is a rectangular region.

The general encoding control (420) receives pictures for the input video signal (405) as well as feedback (not shown) from various modules of the encoder (400). Overall, the general encoding control (420) provides control signals (not shown) to other modules (such as the tiling module (410), transformer/scaler/quantizer (430), scaler/inverse transformer (435), intra-picture estimator (440), motion estimator (450) and intra/inter switch) to set and change coding parameters during encoding. In particular, in conjunction with the motion estimator (450), the general encoding control (420) can determine MV precision during encoding. The general encoding control (420) can also evaluate intermediate results during encoding, for example, performing rate-distortion analysis. The general encoding control (420) produces general control data (422) that indicates decisions made during encoding, so that a corresponding decoder can make consistent decisions. The general control data (422) is provided to the header formatter/entropy coder (490).

If the current picture is predicted using inter-picture prediction, a motion estimator (450) estimates the motion of blocks of sample values of the current picture of the input video signal (405) with respect to one or more reference pictures. The motion estimator (450) can select a motion vector ("MV") precision (e.g., integer-sample MV precision, ½-sample MV precision, or ¼-sample MV precision) as described herein, then use the selected MV precision during motion estimation. The decoded picture buffer (470) buffers one or more reconstructed previously coded pictures for use as reference pictures. When multiple reference pictures are used, the multiple reference pictures can be from different temporal directions or the same temporal direction. The motion estimator (450) produces as side information motion data (452) such as MV data, merge mode index values and reference picture selection data, as well as side information that indicates the selected MV precision. The side information including motion data (452) is provided to the header formatter/entropy coder (490) as well as the motion compensator (455).

The motion compensator (455) applies MV values having the selected MV precision to the reconstructed reference picture(s) from the decoded picture buffer (470). When the chroma data for a picture has the same resolution as the luma data (e.g. when the format is YUV 4:4:4 format or RGB 4:4:4 format), the MV value that is applied for a chroma block may be the same as the MV value applied for the luma block. On the other hand, when the chroma data for a picture has reduced resolution relative to the luma data (e.g. when the format is YUV 4:2:0 format or YUV 4:2:2 format), the MV value that is applied for a chroma block may be a MV value that has been scaled down and possibly rounded to adjust for the difference in chroma resolution (e.g., for YUV 4:2:0 format, by dividing the vertical and horizontal components of the MV value by two and truncating or rounding them to the precision used for the chroma motion compensation process; for YUV 4:2:2 format, by dividing the horizontal component of the MV value by two and truncating or rounding it to the precision used for the chroma motion compensation process). The motion compensator (455) produces motion-compensated predictions for the current picture.

In a separate path within the encoder (400), an intra-picture estimator (440) determines how to perform intra-picture prediction for blocks of sample values of a current picture of the input video signal (405). The current picture can be entirely or partially coded using intra-picture coding. Using values of a reconstruction (438) of the current picture, for intra spatial prediction, the intra-picture estimator (440) determines how to spatially predict sample values of a current block of the current picture from neighboring, previously reconstructed sample values of the current picture. Or, for intra BC prediction using BV values, the intra-picture estimator (440) estimates displacement of the sample values of the current block to different candidate regions within the current picture.

The intra-picture estimator (440) produces as side information intra prediction data (442), such as information indicating whether intra prediction uses spatial prediction or intra BC prediction (e.g., a flag value per intra block), prediction mode direction (for intra spatial prediction), and BV values (for intra BC prediction). The intra prediction data (442) is provided to the header formatter/entropy coder (490) as well as the intra-picture predictor (445).

According to the intra prediction data (442), the intra-picture predictor (445) spatially predicts sample values of a current block of the current picture from neighboring, previously reconstructed sample values of the current picture. Or, for intra BC prediction, the intra-picture predictor (445) predicts the sample values of the current block using previously reconstructed sample values of an intra-prediction region, which is indicated by a BV value for the current block.

The intra/inter switch selects values of a motion-compensated prediction or intra-picture prediction for use as the prediction (458) for a given block. When residual coding is not skipped, the difference (if any) between a block of the prediction (458) and a corresponding part of the original current picture of the input video signal (405) provides values of the residual (418). During reconstruction of the current picture, when residual values have been encoded/signaled, reconstructed residual values are combined with the prediction (458) to produce a reconstruction (438) of the original content from the video signal (405). In lossy compression, however, some information is still lost from the video signal (405).

In the transformer/scaler/quantizer (430), when a frequency transform is not skipped, a frequency transformer converts spatial-domain video data into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of prediction residual data (or sample value data if the prediction (458) is null), producing blocks of frequency transform coefficients. The encoder (400) may also be able to indicate that such transform step is skipped. The scaler/quantizer scales and quantizes the transform coefficients. For example, the quantizer applies dead-zone scalar quantization to the frequency-domain data with a quantization step size that varies on a frame-by-frame basis, tile-by-tile basis, slice-by-slice basis, block-by-block basis, frequency-specific basis or other basis. The quantized transform coefficient data (432) is provided to the header formatter/entropy coder (490). If the frequency transform is skipped, the scaler/quantizer can scale and quantize the blocks of prediction residual data (or sample value data if the prediction (458) is null), producing quantized values that are provided to the header formatter/entropy coder (490).

In the scaler/inverse transformer (435), a scaler/inverse quantizer performs inverse scaling and inverse quantization on the quantized transform coefficients. An inverse frequency transformer performs an inverse frequency transform, producing blocks of reconstructed prediction residual values or sample values. If the transform stage has been skipped, the inverse frequency transform is also skipped. In this case, the scaler/inverse quantizer can perform inverse scaling and inverse quantization on blocks of prediction residual data (or sample value data), producing reconstructed values. When residual values have been encoded/signaled, the encoder (400) combines reconstructed residual values with values of the prediction (458) (e.g., motion-compensated prediction values, intra-picture prediction values) to form the reconstruction (438). When residual values have not been encoded/signaled, the encoder (400) uses the values of the prediction (458) as the reconstruction (438).

For intra-picture prediction, the values of the reconstruction (438) can be fed back to the intra-picture estimator (440) and intra-picture predictor (445). Also, the values of the reconstruction (438) can be used for motion-compensated prediction of subsequent pictures. The values of the reconstruction (438) can be further filtered. A filtering control (460) determines how to perform deblock filtering and SAO filtering on values of the reconstruction (438), for a given picture of the video signal (405). The filtering control (460) produces filter control data (462), which is provided to the header formatter/entropy coder (490) and merger/filter(s) (465).

In the merger/filter(s) (465), the encoder (400) merges content from different tiles into a reconstructed version of the picture. The encoder (400) selectively performs deblock filtering and SAO filtering according to the filter control data (462), so as to adaptively smooth discontinuities across boundaries in the frames. Other filtering (such as de-ringing filtering or ALF; not shown) can alternatively or additionally be applied. Tile boundaries can be selectively filtered or not filtered at all, depending on settings of the encoder (400), and the encoder (400) may provide syntax within the coded bitstream to indicate whether or not such filtering was applied. The decoded picture buffer (470) buffers the reconstructed current picture for use in subsequent motion-compensated prediction.

The header formatter/entropy coder (490) formats and/or entropy codes the general control data (422), quantized transform coefficient data (432), intra prediction data (442), motion data (452) and filter control data (462). MV values can be predictively coded. For example, the header formatter/entropy coder (490) uses Exponential-Golomb coding for entropy coding of various syntax elements such as syntax elements for differential MV values, after MV prediction.

The header formatter/entropy coder (490) provides the encoded data in the coded video bitstream (495). The format of the coded video bitstream (495) can be a variation or extension of HEVC format, Windows Media Video format, VC-1 format, MPEG-x format (e.g., MPEG-1, MPEG-2, or MPEG-4), H.26x format (e.g., H.261, H.262, H.263, H.264), or another format.

Depending on implementation and the type of compression desired, modules of the encoder can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (400). The relationships shown between modules within the encoder (400) indicate general flows of information in the encoder; other relationships are not shown for the sake of simplicity.

V. Selection of MV Precision During Encoding.

This section presents various approaches to selection of motion vector ("MV") precision during encoding. These approaches can facilitate compression that is effective in terms of rate-distortion performance and/or computational efficiency of encoding and decoding.

The approaches described herein for selecting MV precision can be applied when encoding any type of video. In particular, however, selection of MV precision as described herein can improve performance when encoding certain artificially-created video content such as screen capture content.

A. Types of Video.

In general, screen capture video (also called screen content video or screen capture content) represents the output of a graphics rendering process that generates content for a computer screen or other display. This contrasts with natural video, which refers to video imagery captured from a camera sensor view of real-world objects, or video having similar characteristics. Screen capture video typically contains rendered text, computer graphics, animation-generated content or other similar types of content captured from the output of a rendering process for a computer display, as opposed to (or in addition to) camera-captured video content only. Common scenarios for encoding/decoding of screen capture content include remote desktop conferencing and encoding/decoding of graphical or text overlays on natural video or other "mixed content" video. Several of the innovations described herein are adapted for encoding of screen capture video or other artificially-created video. These innovations can also be used for natural video, but may not be as effective. Other innovations described herein are effective in encoding of natural video or artificially-created video.

Figure 5:
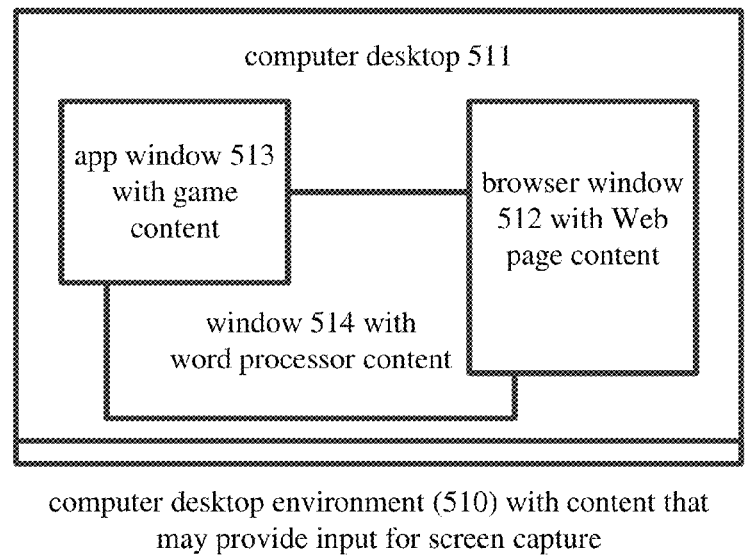
FIG. 5 is diagram illustrating a computer desktop environment with content that may provide input for screen capture.

FIG. 5 shows a computer desktop environment (510) with content that may provide input for screen capture. For example, screen capture video can represent a series of images of the entire computer desktop (511). Or, screen capture video can represent a series of images for one of the windows of the computer desktop environment, such as the app window (513) including game content, browser window (512) with Web page content or window (514) with word processor content.

As computer-generated, artificially-created video content, screen capture content tends to have relatively few discrete sample values, compared to natural video content that is captured using a video camera. For example, a region of screen capture content often includes a single uniform color, whereas a region in natural video content more likely includes colors that gradually vary. Also, screen capture content typically includes distinct structures (e.g., graphics, text characters) that are exactly repeated from frame-to-frame, even if the content may be spatially displaced (e.g., due to scrolling). Screen capture content is usually encoded in a format (e.g., YUV 4:4:4 or RGB 4:4:4) with high chroma sampling resolution, although it may also be encoded in a format with lower chroma sampling resolution (e.g., YUV 4:2:0, YUV 4:2:2).

Figure 6:
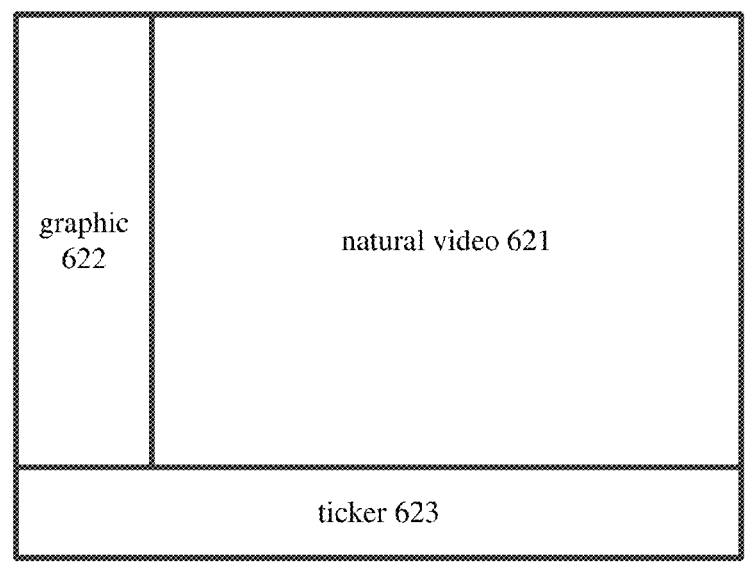
FIG. 6 is a diagram illustrating mixed-content video with natural video content and artificial video content.

FIG. 6 shows mixed-content video (620) that includes some natural video (621) and some artificially-created video content. The artificially-created video content includes a graphic (622) beside the natural video (621) and a ticker (623) running below the natural video (621). Like the screen capture content shown in FIG. 5, the artificially-created video content shown in FIG. 6 tends to have relatively few discrete sample values. It also tends to have distinct structures (e.g., graphics, text characters) that are exactly repeated from frame-to-frame (e.g., due to scrolling).

Screen capture video or mixed-content video can be periodically read from an output buffer for a display device, or from one or more other buffers storing frames. Or, screen capture video can be provided from a screen capture module (which may periodically read values from an output buffer for a display device, intercept display commands from an operating system module, or otherwise capture sample values to be displayed). Screen capture video or mixed-content video can be from a "live" stream or from a previously recorded stream in storage.

B. Different MV Precisions.

In many encoding scenarios, when encoding screen capture video or other artificially-created video content, most MV values represent integer-sample spatial displacements, and very few MV values represent fractional-sample spatial displacements. This provides opportunities for reducing MV precision to improve overall performance.

Figure 7A:
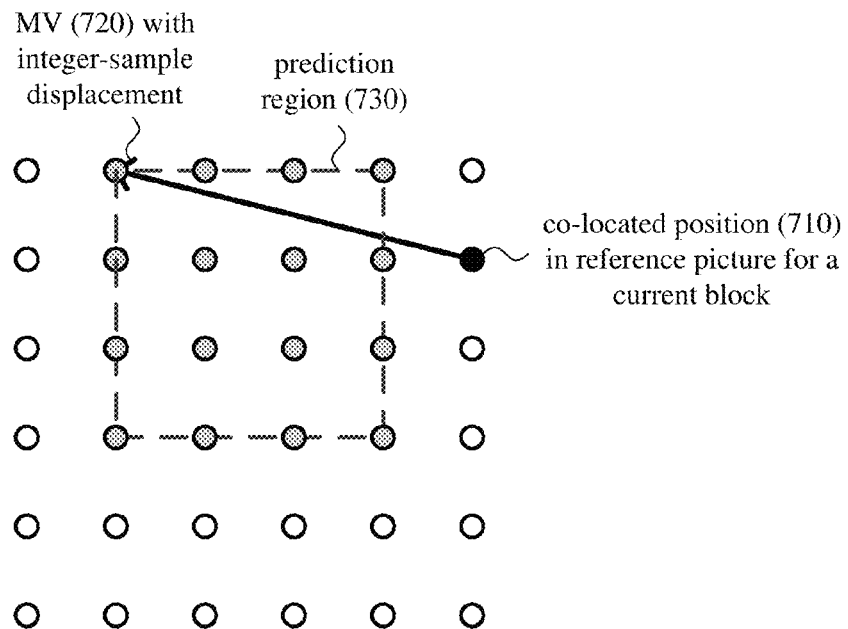
FIGS. 7a and 7b are diagrams illustrating motion compensation with MV values having an integer-sample spatial displacement and fractional-sample spatial displacement, respectively.

FIG. 7a shows motion compensation with an MV (720) having an integer-sample spatial displacement. The MV (720) indicates a spatial displacement of four samples to the left, and one sample up, relative to the co-located position (710) in a reference picture for a current block. For example, for a 4×4 current block at position (64, 96) in a current picture, the MV (720) indicates a 4×4 prediction region (730) whose position is (60, 95) in the reference picture. The prediction region (730) includes reconstructed sample values at integer-sample positions in the reference picture. An encoder or decoder need not perform interpolation to determine the values of the prediction region (730).

Figure 7B:
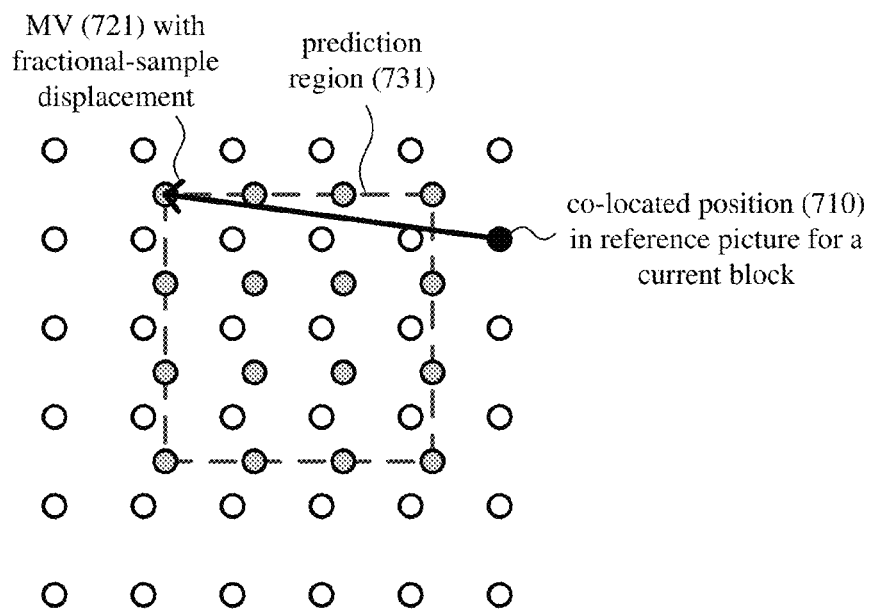

FIG. 7b shows motion compensation with an MV (721) having a fractional-sample spatial displacement. The MV (721) indicates a spatial displacement of 3.75 samples to the left, and 0.5 samples up, relative to the co-located position (710) in a reference picture for a current block. For example, for a 4×4 current block at position (64, 96) in a current picture, the MV (721) indicates a 4×4 prediction region (731) whose position is (60.25, 95.5) in the reference picture. The prediction region (731) includes interpolated sample values at fractional-sample positions in the reference picture. An encoder or decoder performs interpolation to determine the sample values of the prediction region (731). When fractional-sample spatial displacements are allowed, there are more candidate prediction regions that may match a current block, and thus the quality of motion-compensated prediction usually improves, at least for some types of video content (e.g., natural video).

When MV precision is integer-sample precision for a unit of video, all MV values for blocks in the unit indicate integer-sample spatial displacements. When MV precision is a fractional-sample precision for a unit of video, an MV value for a block in the unit can indicate a fractional-sample spatial displacement or an integer-sample spatial displacement. That is, when MV precision is a fractional-sample precision for a unit of video, some MV values for blocks in the unit can indicate fractional-sample spatial displacements, while other MV values for blocks in the unit indicate integer-sample spatial displacements.

When encoding a block using motion estimation and motion compensation, an encoder often computes the sample-by-sample differences (also called residual values or error values) between the sample values of the block and its motion-compensated prediction. The residual values may then be encoded. For the residual values, encoding efficiency depends on the complexity of the residual values and how much loss or distortion is introduced as part of the compression process. In general, a good motion-compensated prediction closely approximates a block, such that the residual values are small-amplitude differences that can be efficiently encoded. On the other hand, a poor motion-compensated prediction often yields residual values that include larger-amplitude values, which are more difficult to encode efficiently. Encoders typically spend a large proportion of encoding time performing motion estimation, attempting to find good matches and thereby improve rate-distortion performance.

When a codec uses MV values with integer-sample MV precision, an encoder and decoder need not perform interpolation operations between sample values of reference pictures for motion compensation, since the MV values indicate integer-sample spatial displacements. When a codec uses MV values with fractional-sample MV precision, an encoder and decoder may perform interpolation operations between sample values of reference pictures for motion compensation (adding computational complexity, at least for MV values that indicate fractional-sample spatial displacements), but motion-compensated predictions tend to more closely approximate blocks (leading to residual values with fewer significant values), compared to integer-sample MV precision.

C. Representation of MV Values.

MV values are typically represented using integer values whose meaning depends on an associated MV precision. For integer-sample MV precision, for example, an integer value of 1 indicates a spatial displacement of 1 sample, an integer value of 2 indicates a spatial displacement of two samples, and so on. For ¼-sample MV precision, for example, an integer value of 1 indicates a spatial displacement of 0.25 samples. Integer values of 2, 3, 4 and 5 indicate spatial displacements of 0.5, 0.75, 1.0 and 1.25 samples, respectively. Regardless of MV precision, the integer value can indicate a magnitude of the spatial displacement, and separate flag value can indicate whether displacement is negative or positive. The horizontal MV component and vertical MV component of a given MV value can be represented using two integer values. Thus, the meaning of two integer values representing an MV value depends on MV precision. For example, for an MV value having a 2-sample horizontal displacement and no vertical displacement, if MV precision is ¼-sample MV precision, the MV value is represented as (8, 0). If MV precision is integer-sample MV precision, however, the MV value is represented as (2, 0).

MV values in a bitstream of encoded video data are typically entropy coded (e.g., on an MV-component-wise basis). An MV value may also be differentially encoded relative to a predicted MV value (e.g., on an MV-component-wise basis). In many cases, the MV value equals the predicted MV value, so the differential MV value is zero, which can be encoded very efficiently. A differential MV value (or MV value, if MV prediction is not used) can be entropy encoded using Exponential-Golomb coding, context-adaptive binary arithmetic coding or another form of entropy coding. Although the exact relationship between MV value (or differential MV value) and encoded bits depends on the form of entropy coding used, in general, smaller values are encoded more efficiently (that is, using fewer bits) because they are more common, and larger values are encoded less efficiently (that is, using more bits) because they are less common.

D. Adaptive MV Precision—Introduction.

To summarize the preceding three sections, using MV values with integer-sample MV precision tends to reduce bit rate associated with signaling the MV values and reduce the computational complexity of encoding and decoding (by avoiding interpolation of sample values at fractional-sample positions in reference pictures), but may reduce the quality of motion-compensated prediction and thus increase the amplitude of the residual values, at least for some types of video content. On the other hand, using MV values with fractional-sample MV precision tends to increase bit rate associated with signaling the MV values and increase the computational complexity of encoding and decoding (by including interpolation of sample values at fractional-sample positions in reference pictures), but may improve the quality of motion-compensated prediction and reduce the amplitude of the residual values, at least for some types of video content. In general, the computational complexity, bit rate for signaling MV values, and quality of motion-compensated prediction increase as MV precision increases (e.g., from integer-sample to ½-sample, or from ½-sample to ¼-sample), up to a point of diminishing returns. At the same time, although increased MV precision tends to increase the bit rate needed to signal the MV values, when encoding natural content the associated improvement in the quality of motion-compensated prediction may reduce the bit rate needed to send an adequate approximation of the residual values and thereby reduce the total bit rate needed to encode the video content with adequate picture quality.

When encoding screen capture video or other artificially-created video content, the added costs of fractional-sample MV precision (in terms of bit rate and computational complexity) may be unjustified. For example, if most MV values represent integer-sample spatial displacements, and very few MV values represent fractional-sample spatial displacements, the added costs of fractional-sample MV precision are not warranted. The encoder can skip searching at fractional-sample positions (and skip interpolation operations to determine sample values at fractional-sample positions) during motion estimation. For such content, bit rate and computational complexity can be reduced, without a significant penalty to the quality of motion-compensated prediction, by using MV values with integer-sample MV precision.

Since fractional-sample MV precision may still be useful for other types of video content (e.g., natural video captured by camera), an encoder and decoder can be adapted to switch between MV precisions. For example, an encoder and decoder can use integer-sample MV precision for screen capture video, but use a fractional-sample MV precision (such as ¼-sample MV precision) for natural video. Approaches that an encoder may follow when selecting MV precision are described in the next section. The encoder can signal the selected MV precision to the decoder using one or more syntax elements in the bitstream.

In one approach to signaling MV precision, when adaptive selection of MV precision is enabled, the encoder selects an MV precision on a slice-by-slice basis. A flag value in a sequence parameter set ("SPS"), picture parameter set ("PPS") or other syntax structure indicates whether adaptive selection of MV precision is enabled. If so, one or more syntax elements in a slice header for a given slice indicate the selected MV precision for blocks of that slice. For example, a flag value of 0 indicates ¼-sample MV precision, and a flag value of 1 indicates integer-sample MV precision.

In another approach to signaling MV precision, the encoder selects an MV precision on a picture-by-picture basis or slice-by-slice basis. A syntax element in a PPS indicates one of three MV precision modes: (0) ¼-sample MV precision for MV values of slice(s) of a picture associated with the PPS, (1) integer-sample MV precision for MV values of slice(s) of a picture associated with the PPS, or (2) slice-adaptive MV precision depending on a flag value signaled per slice header, where the flag value in the slice header of a slice can indicate ¼-sample MV precision or integer-sample MV precision for MV values of the slice. For additional details about this approach in one implementation, see JCTVC-P0277.

In still another approach to signaling MV precision, when adaptive selection of MV precision is enabled, the encoder selects an MV precision on a CU-by-CU basis. One or more syntax elements in a structure for a given CU indicate the selected MV precision for blocks of that CU. For example, a flag value in a CU syntax structure for a CU indicates whether MV values for all PUs associated with the CU have integer-sample MV precision or ¼-sample MV precision. For additional details about this approach in one implementation, see JCTVC-P0283.

In any of these approaches, the encoder and decoder can use different MV precisions for horizontal and vertical MV components. This can be useful when encoding screen capture video that has been scaled horizontally or vertically (e.g., using integer-sample MV precision in an unscaled dimension, and using a fractional-sample MV precision in a scaled dimension). In some implementations, if rate control cannot be achieved solely through adjustment of QP values, an encoder may resize screen capture video horizontally or vertically to reduce bit rate, then encode the resized video. At the decoder side, the video is scaled back to its original dimensions after decoding. The encoder can signal the MV precision for horizontal MV components (e.g., with a first flag value or syntax element) and also signal the MV precision for vertical MV components (e.g., with a second flag value or syntax element) to the decoder.

More generally, when adaptive selection of MV precision is enabled, the encoder selects an MV precision and signals the selected MV precision in some way. For example, a flag value in a SPS, PPS or other syntax structure can indicate whether adaptive selection of MV precision is enabled. When adaptive MV precision is enabled, one or more syntax elements in sequence-layer syntax, group-of-pictures-layer syntax ("GOP-layer syntax"), picture-layer syntax, slice-layer syntax, tile-layer syntax, block-layer syntax or another syntax structure can indicate the selected MV precision for MV values. Or, one or more syntax elements in sequence-layer syntax, GOP-layer syntax, picture-layer syntax, slice-header-layer syntax, slice-data-layer syntax, tile-layer syntax, block-layer syntax or another syntax structure can indicate MV precisions for different MV components. When there are two available MV precisions, a flag value can indicate a selection between the two MV precisions. Where there are more available MV precisions, an integer value can indicate a selection between those MV precisions.

Aside from modifications to signal/parse the syntax elements that indicate selected MV precision(s), decoding can be modified to change how signaled MV values are interpreted depending on the selected MV precision. The details of how MV values are encoded and reconstructed can vary depending on MV precision. For example, when the MV precision is integer-sample precision, predicted MV values can be rounded to the nearest integer, and differential MV values can indicate integer-sample offsets. Or, when the MV precision is ¼-sample precision, predicted MV values can be rounded to the nearest ¼-sample offset, and differential MV values can indicate ¼-sample offsets. Or, MV values can be signaled in some other way. When MV values have integer-sample MV precision and the video uses 4:2:2 or 4:2:0 chroma sampling, chroma MV values can be derived by scaling, etc., which may result in ½-sample displacements for chroma. Or, chroma MV values can be rounded to integer values.

E. Approaches to Selecting MV Precision.

When MV precision can be adapted during video encoding, an encoder selects an MV precision for a unit of video. The encoder can select the MV precision(s) to use based on hints from a video source (see approach 1, below). For example, the video source can indicate that video is screen capture content or natural video (captured from a camera). Or, the encoder can select the MV precision(s) based on exhaustive evaluation of the various MV precisions (see approach 2, below). Or, the encoder can select the MV precision(s) based on analysis of statistical data from previous units and/or statistical data for the current unit being encoded (see approaches 3-4, below).

Some of the approaches to selecting MV precision are adapted to screen capture encoding scenarios. Other approaches more generally apply when encoding any type of video content.

In some examples described in this section, the encoder selects between using ¼-sample MV precision and integer-sample MV precision. More generally, the encoder selects between multiple available MV precisions, which can include integer-sample MV precision, ½-sample MV precision, ¼-sample MV precision and/or another MV precision.

When an encoder selects an MV precision for a unit of video, the unit of video can be a sequence, GOP, picture, slice, tile, CU, PU, other block or other type of unit of video. Depending on a desired tradeoff between complexity and flexibility, selecting MV precision on a highly-local basis (e.g., CU-by-CU basis), a larger region-by-region basis (e.g., tile-by-tile basis or slice-by-slice basis), whole picture basis, or more global basis (e.g., per encoding session, per sequence, per GOP, or per series of pictures between detected scene changes) may be appropriate.

1. Approaches that Use Hints from Application, Operating System or Video Source.

An encoder can select MV precision based on a hint signaled by an application, operating system or video source. For example, the hint can indicate that the video content to be encoded was rendered by a particular application, such as a word processor, spreadsheet application, or Web browser (without an embedded video region, which may be natural video content). Rendering with such an application would tend to produce only integer-sample spatial displacements of the content. Based on such a hint, the encoder can select integer-sample MV precision. For content rendered with a word processor, spreadsheet application, Web browser or other application that does not usually render natural video content, integer-sample MV precision is likely preferable to fractional-sample MV precision. (But fractional-sample MV precision may be preferable if the video has been resized.)

Or, the hint can indicate that video content was delivered by a screen capture module or other video source that typically delivers artificially-created video content. For such content, integer-sample MV precision is likely preferable to fractional-sample MV precision, so the encoder selects integer-sample MV precision. (But fractional-sample MV precision may be preferable if the video has been resized.)

On the other hand, if the hint indicates video content was delivered by a camera, DVD or other disk, or tuner card, or rendered by a video player, the encoder can select a fractional-sample MV precision. For such content, fractional-sample MV precision is likely preferable to integer-sample MV precision.

A hint can apply to an encoding session, to a series of frames, to a single video frame or to part of a video frame (such as an area corresponding to a window associated with an application).

In some cases, an encoder may not receive or may be unable to interpret a hint provided by a video source, operating system or application concerning the nature of the video content. Or, the hint may be incorrect or misleading (e.g., for mixed-content video that includes natural video content and artificially-created video content, or for video that has been resized). In such cases, the encoder can use another approach to determine which MV precision(s) should be selected.

2. Brute-Force Encoding Approaches.

In another set of approaches to selecting MV precision, the encoder encodes a unit of video multiple times using different MV precisions (e.g., once with integer-sample MV precision, once with ¼-sample MV precision). The encoder selects the MV precision that provides the best performance, and uses the selected MV precision when encoding the unit for output. The unit of video can be a block, PU, CU, slice, tile, picture, GOP, sequence or other type of unit of video. Typically, the encoder performs multiple passes of encoding in such approaches.

To evaluate which MV precision provides the best performance, the encoder can determine rate-distortion cost when the different MV precisions are used during encoding of the unit, and select the option with the lowest rate-distortion cost. A rate-distortion cost has a distortion cost D and a bit rate cost R, with a factor $\lambda$, (often called a Lagrangian multiplier) that weights the bit rate cost relative to the distortion cost (D+$\lambda$R) or vice versa (R+$\lambda$D). The bit rate cost can be an estimated or actual bit rate cost. In general, the distortion cost is based upon a comparison of original samples to reconstructed samples. The distortion cost can be measured as sum of absolute differences ("SAD"), sum of absolute Hadamard-transformed differences ("SAHD") or other sum of absolute transformed differences ("SATD"), sum of squared errors ("SSE"), mean squared error ("MSE"), mean variance or another distortion metric. The factor $\lambda$, can vary during encoding (e.g., increasing the relative weight of the bit rate cost when quantization step size is larger). Rate-distortion cost usually provides the most accurate assessment of the performance of different MV precision options, but also has the highest computational complexity.

The encoder can vary one or more of terms of the rate-distortion cost function to bias the rate-distortion analysis towards the integer-sample MV precision option. For example, when determining an MV precision for a unit of video using rate-distortion analysis to decide between multiple MV precisions, the rate-distortion analysis is biased towards the integer-sample MV precision by scaling the distortion cost, adding a penalty to the distortion cost, scaling the bit rate cost, adding a penalty to the bit rate cost, and/or adjusting a Lagrangian multiplier factor. When evaluating a fractional-sample MV precision, the encoder can scale up the distortion cost (by a factor greater than 1), scale up the bit rate cost (by a factor greater than 1), add a distortion penalty, add a bit rate penalty and/or use a larger Lagrangian multiplier factor. Or, when evaluating the integer-sample MV precision, the encoder can scale down the distortion cost (by a factor less than 1), scale down the bit rate cost (by a factor less than 1), and/or use a smaller Lagrangian multiplier factor.

The encoder can vary the extent of bias towards or against integer-sample MV precision during encoding. For example, the encoder can adjust bias towards integer-sample MV precision depending on a degree of confidence that integer-sample MV values are likely to be more appropriate for encoding the video content (e.g., increasing bias towards integer-sample MV precision if the video content is likely artificially-created content). Or, the encoder can adjust bias towards integer-sample MV precision depending on computational capacity for encoding and/or decoding (e.g., increasing bias towards integer-sample MV precision if available computational capacity is lower).

Alternatively, the encoder can use another approach to evaluate which MV precision provides the best performance. For example, the encoder measures which MV precision results in the fewest bits of encoded data, for a given quantization step size. Or, the encoder evaluates only distortion for encoding that uses the different MV precisions. Or, the encoder uses a simpler measure such as distortion reduction benefit for fractional-sample MV precision compared to integer-sample MV precision, which may be simple enough to determine in a single pass of encoding. For example, the encoder examines the amount of distortion reduction (in terms of SAD, SATD, TSE, MSE or another distortion metric) when a fractional-sample MV precision is used, compared to when integer-sample MV precision is used.

Brute-force encoding approaches can be computationally intensive. They potentially involve significant additional computations, additional memory storage, and additional memory read and write operations, compared to encoding that uses a fixed MV precision.

3. Approaches that Use Content Analysis.

In another set of approaches to selecting MV precision, an encoder selects the MV precision for a unit of video based on analysis of input video content and/or encoded video content. The unit of video can be a block, PB, PU, CU, CTU, sub-macroblock partition, macroblock, slice, tile, picture, GOP, sequence or other type of unit of video.

Figure 8:
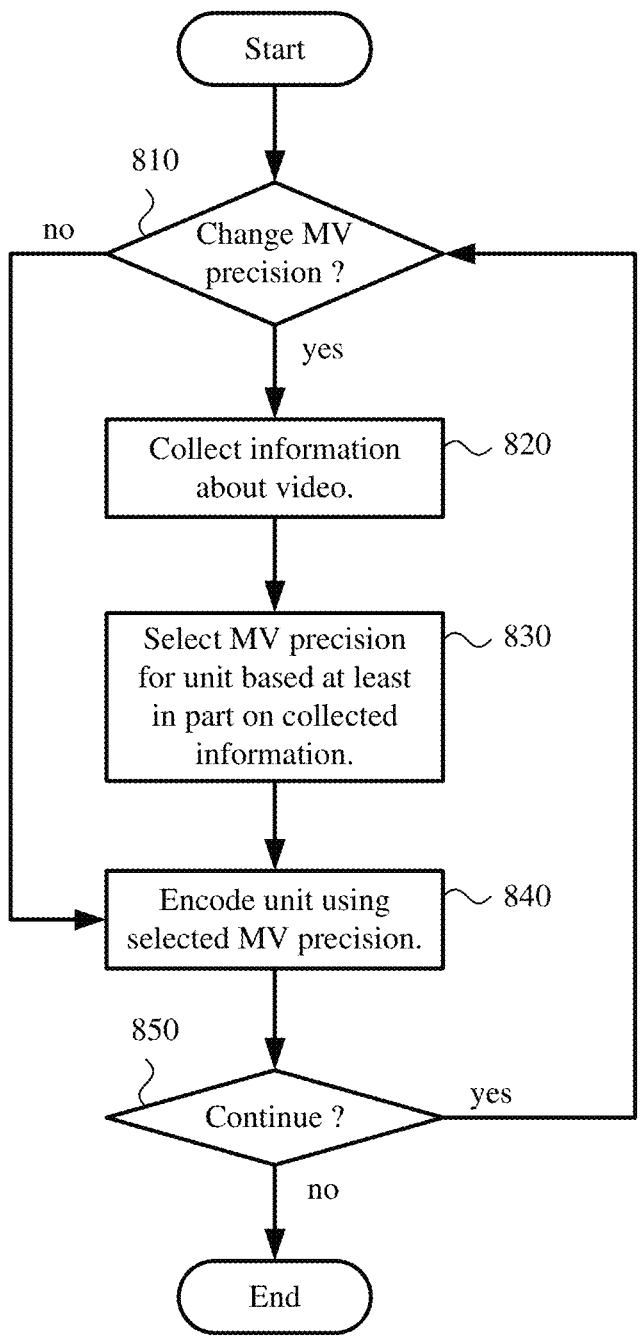
FIG. 8 is a flowchart illustrating a generalized technique for adapting MV precision during encoding.

FIG. 8 shows a technique (800) for adapting MV precision during encoding. The technique (800) can be performed by an encoder such as one described with reference to FIG. 3 or FIGS. 4a and 4b, or by another encoder. According to the technique (800), during encoding of video, the encoder determines an MV precision from among multiple MV precisions for units of the video. The multiple MV precisions can include one or more fractional-sample MV precisions as well as integer-sample MV precision. For example, the multiple MV precisions can include integer-sample MV precision and ¼-sample MV precision. Or, the multiple MV precisions can include integer-sample MV precision, ½-MV precision and ¼-sample MV precision.

Specifically, when encoding a unit of video, the encoder determines (810) whether to change MV precision. At the start of encoding, the encoder can initially set the MV precision according to a default value, or proceed as if changing the MV precision. For later units of video, the encoder may use the current MV precision (which was used for one or more previously encoded units) or change the MV precision. For example, the encoder can decide to change MV precision upon the occurrence of a defined event (e.g., after encoding of a threshold-valued number of units, after a scene change, after a determination that the type of video has changed).

To change the MV precision, the encoder collects (820) information about the video. In general, the collected information can be characteristics of input video or characteristics of encoded video. The collected information can relate to the current unit being encoded and/or relate to previously encoded units of the video. (When the collected information relates to one or more previously encoded units of the video, the collection (820) of such information can happen before, during or after the encoding of the previous unit(s). This collection (820) is different than the timing shown in FIG. 8, and happens regardless of the decision (810) about changing MV precision.) The encoder then selects (830) MV precision for the unit of the video based at least in part on the collected information.

As one example, the encoder can collect sample values for the current unit. The presence of a small number of discrete sample values tends to indicate screen capture content, and hence suggest that integer-sample MV precision should be selected. On the other hand, the presence of a large number of discrete sample values tends to indicate natural video, and hence suggest that fractional-sample MV precision should be selected. The sample values can be organized as a histogram. Sample values can be collected from only luma (Y) samples in a YUV color space, from luma as well as chroma (U, V) samples in a YUV color space, from R, G and B samples in a RGB color space, or from only G (or R or B)

samples in a RGB color space. For example, when selecting the MV precision, the encoder determines a count of distinct sample values among the collected sample values. The encoder compares the count to a threshold. If the count is lower than the threshold, the encoder selects integer-sample MV precision. If the count is higher than the threshold, the encoder selects a fractional-sample MV precision. The boundary condition (count equals threshold) can be handled using either option, depending on implementation. Or, the encoder otherwise considers statistics from the collected sample values. For example, the encoder determines whether the x most common collected sample values account for more than y % of the sample values. If so, the encoder selects integer-sample MV precision; otherwise, the encoder selects a fractional-sample MV precision. The values of x and y depend on implementation. The value of x can be 10 or some other count. The value of y can be 80, 90 or some other percentage less than 100.

As another example, the encoder can collect distortion measures for blocks of the current unit encoded with the respective MV precisions. For example, the encoder records improvement (reduction) in distortion when using fractional-sample MV precision, compared to integer-sample MV precision. When selecting the MV precision, the encoder determines whether a reduction in distortion justifies an increase in MV precision.

As another example, the encoder can collect MV values (having a fractional-sample MV precision) for one or more previous units. The collected MV values can be organized according to value of their fractional parts, e.g., for ¼-sample MV precision MV values, in a histogram with a bin for MV values having fractional part of zero, a bin for MV values having fractional part of 0.25, a bin for MV values having a fractional part of 0.5, and a bin for MV values having a fractional part of 0.75. Low-complexity variations of this approach are described in the next section.

As another example, the encoder can collect information about count of encoded bits for MV data (differential MV values) for blocks encoded using a fractional-sample MV precision. A low average number of bits for differential MV values indicates regular (predictable) motion and is more common when integer-sample MV precision would be appropriate. A high average number of bits used for differential MV values is more common when fractional-sample MV precision would be appropriate. When selecting the MV precision, the encoder measures an average (or median) number of bits among the counts of encoded bits for differential MV values. The encoder compares the measure to a threshold. If the measure is lower than the threshold, the encoder selects integer-sample MV precision. If the measure is higher than the threshold, the encoder selects a fractional-sample MV precision. The boundary condition (measure equals threshold) can be handled using either option, depending on implementation.

As another example, when encoding a unit, the encoder evaluates the multiple MV precisions per block (e.g., PU) of the unit, and collects information per block that indicates which MV precision provides the best performance for that block. The encoder can determine the rate-distortion cost (e.g., D+λR) when a block is encoded using integer-sample MV precision, and also determine the rate-distortion cost (e.g., D+λR) when the block is encoded using a fractional-sample MV precision. The encoder determines how many times each of the multiple MV precisions is best for the respective blocks within the unit, and selects the MV precision with the largest count. For example, for each of the blocks in a picture, the encoder determines rate-distortion cost when the block is encoded using integer-sample MV precision, and also determines the rate-distortion cost when the block is encoded using ¼-sample MV precision. The encoder counts the number of times integer-sample MV precision would be better and the number of times ¼-sample MV precision would be better, then picks the higher of the two. Alternatively, the encoder determines a count of how many times integer-sample MV precision is best for the blocks of the unit, then selects integer-sample MV precision only if the count is higher than a threshold percentage of the number of blocks in the unit. In some implementations, the encoder considers blocks with any value of MV. In other implementations, the encoder considers only blocks with non-zero-value MVs. This block-wise evaluation of the multiple MV precisions can be performed for blocks of a given unit in order to select the MV precision for one or more subsequent units, regardless of the MV precision mode used for the given unit. Or, the block-wise evaluation of the multiple MV precisions can be performed for a given unit in order to select the MV precision for the given unit.

Alternatively, the encoder uses another approach to collecting information and selecting the MV precision based at least in part on the selected information.

Returning to FIG. 8, whether or not the MV precision has changed, the encoder encodes (840) the unit using the selected MV precision. MV values for blocks (e.g., PUs, macroblocks, or other blocks) within the unit of the video have the selected MV precision. The encoder outputs encoded data for the current unit, e.g., in a bitstream. The encoded data can include syntax elements that indicate the selected MV precision.

The encoder decides (850) whether to continue with the next unit. If so, the encoder decides (810) whether to change the MV precision for the next unit. Thus, MV precision can be selected for each unit (e.g., per segment, per GOP, per picture, per slice, per CTU, per CU, per PU, per PB, per macroblock, per sub-macroblock partition). Or, to reduce complexity, the MV precision for a unit can be changed from time-to-time (e.g., periodically or upon the occurrence of a defined event), then repeated for one or more subsequent units.

When the encoder uses the same pattern of tiles from picture-to-picture, the encoder can repeat per-tile MV precisions from picture-to-picture. Co-located tiles from picture-to-picture can use the same MV precision. Similarly, co-located slices from picture-to-picture can use the same MV precision. For example, suppose video depicts a computer desktop, and part of the desktop has a window displaying natural video content. A fractional-sample MV precision may be used within that region of the desktop from picture-to-picture, whereas other areas that show text or other rendered content are encoded using integer-sample MV precision.

In this set of approaches, the encoder can use single-pass encoding. For the current unit of video being encoded, the selected MV precision for the current unit depends at least in part on collected information from one or more previous units of the video (in encoding order, which is also called decoding order or bitstream order, not input order, which is also called temporal order, output order or display order).

Alternatively, in this set of approaches, the encoder can use multi-pass encoding or encoding with a short look-ahead window (sometimes called 1.5-pass encoding). For the current unit of video being encoded, the selected MV precision depends at least in part on collected information from the current unit. The selected MV precision for the current unit can also depend at least in part on collected information from one or more previous units of the video (in encoding order, not input order).

In this set of approaches, the encoder can adjust an amount of bias towards or against integer-sample MV precision based at least in part on a degree of confidence that integer-sample MV precision is appropriate. The encoder can also adjust an amount of bias towards or against integer-sample MV precision based at least in part on the computational capacity of encoding and/or decoding (favoring integer-sample MV precision to reduce computational complexity if less computational capacity is available). For example, to favor selection of integer-sample MV precision, the encoder can adjust thresholds used in comparison operations to make it more likely that integer-sample MV precision is selected.

In this set of approaches, the selected MV precision can be for horizontal MV components and/or vertical MV components of the MV values for blocks within the unit of the video, where the horizontal MV components and vertical MV components are permitted to have different MV precisions. Or, the selected MV precision can be for both horizontal MV components and vertical MV components of the MV values for blocks within the unit of the video, where the horizontal MV components and vertical MV components have the same MV precision.

In this set of approaches, the encoded video (e.g., in the bitstream) includes one or more syntax elements that indicate the selected MV precision for the unit. Alternatively, the encoded video can lack any syntax elements that indicate the selected MV precision for the unit (see below, in the section about non-normative approaches). For example, even if the bitstream supports signaling of MV values with a fractional-sample MV precision, the encoder can constrain motion estimation for the unit of the video to use only MV values with fractional parts of zero. This may reduce computational complexity of encoding and decoding by avoiding interpolation operations.

4. Approaches that Use Low-Complexity Content Analysis.

To simplify the decision-making process, an encoder can consider a smaller set of data before selecting MV precision or use simpler decision logic when selecting MV precision, avoiding multiple passes of encoding.

Figure 9:
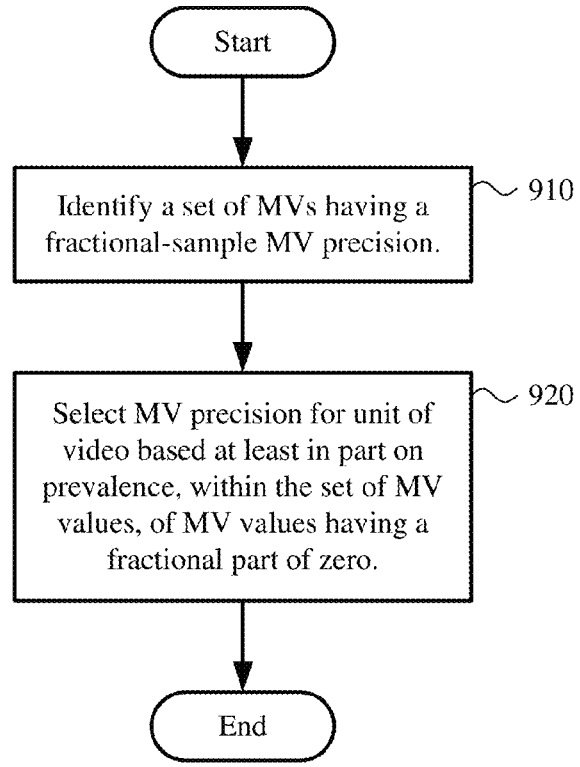
FIG. 9 is a flowchart illustrating an example technique for adapting MV precision during encoding using a low-complexity approach.

FIG. 9 shows a technique (900) for adapting MV precision during encoding using a low-complexity approach. The technique (900) can be performed by an encoder such as one described with reference to FIG. 3 or FIGS. 4a and 4b, or by another encoder. The technique (900) details one approach to collecting information about video and selecting MV precision based at least in part on the collected information, as described with reference to FIG. 8.

According to the technique (900), during encoding of video, the encoder determines an MV precision for a unit of the video. When determining the MV precision for the unit, the encoder identifies (910) a set of MV values having a fractional-sample MV precision. The set of MV values can be allowed to include zero-value MVs and non-zero-value MVs. Or, the set of MV values can be constrained to include only non-zero-value MVs. Or, the set of MV values can further be constrained to include only non-zero-value MVs from blocks of a certain block size or larger.

The encoder selects (920) the MV precision for the unit based at least in part on prevalence, within the set of MV values, of MV values having a fractional part of zero. The prevalence can be measured in terms of the fraction of the set of MV values having a fractional part of zero. For example, for a picture, the encoder can determine the percentage of MV values having a fractional part of zero. Or, for a region or set of regions that uses the set of MV values, the prevalence can be measured in terms of the fraction of that region or set of regions having a fractional part of zero. If the fraction exceeds a threshold, the selected MV precision for the unit is integer-sample MV precision. If the fraction does not exceed the threshold, the selected MV precision for the unit is a fractional-sample MV precision. The boundary condition (the fraction equals threshold) can be handled using either option, depending on implementation.

The selection (920) of the MV precision for the unit can also be based at least in part on prevalence of non-zero-value MVs, such that switching to integer-sample MV precision is permitted if there is a threshold amount of non-zero-value MVs. The prevalence of non-zero-value MVs can be measured in terms of the fraction of MV values that are non-zero-value MVs, in terms of count of blocks that use non-zero-value MVs, or in terms of the fraction of a region or set of regions that uses non-zero-value MVs. In this case, the set of MV values having a fractional-sample MV precision can be identified from among non-zero value MVs of the region or set of regions. Thus, the encoder can consider the prevalence of non-zero-value MVs having a fractional part of zero within the set of MVs that are non-zero-value MVs. For example, the encoder switches to integer-sample MV precision if two conditions are satisfied: (1) a sufficiently large amount of non-zero-value MVs are detected, and (2) within that set of non-zero-value MVs, there are sufficiently many that have a fractional part of zero (or, alternatively, sufficiently few that have a non-zero fractional part). The prevalence of non-zero-value MVs and the prevalence of MV values having a fractional part of zero can be determined by counting MV values (regardless of their associated block size) or by considering the associated block size for MV values (e.g., since some MV values are applied to larger blocks than others).

The encoder encodes the unit using the selected MV precision for the unit. MV values for blocks (e.g., PUs, macroblocks, or other blocks) within the unit of the video have the selected MV precision for the unit. The encoder outputs encoded data for the current unit, e.g., in a bitstream. The encoded data can include syntax elements that indicate the selected MV precision for the unit.

To reduce the amount of time the encoder spends setting MV precision, after integer-sample MV precision is selected for a unit, the selected MV precision can be used for subsequent units of the video until an event causes the MV precision to switch back to a fractional-sample MV precision. For example, the event can be encoding of a defined number of units, a scene change, or a determination, based on observations during encoding, that switching back to the fractional-sample MV precision would be beneficial.

In one example implementation, the encoder encodes a unit of video (e.g., picture, tile, slice or CU) only once. To start, the encoder encodes a unit using ¼-sample MV precision. During encoding, the encoder determines whether fractional parts of MV values are zero or not. For example, the encoder measures what fraction of the MV values have non-zero fractional parts. Or, since some MV values affect larger picture regions than others, the encoder measures what fraction of inter-picture predicted region(s) uses MV values with non-zero fractional parts (measuring area, not count of MV values). If the fraction exceeds a threshold (which depends on implementation and is, for example, 75%), the encoder switches to integer-sample MV precision for one or more subsequent units of the video.

In this example implementation, after the encoder switches to integer-sample MV precision, the encoder can keep that integer-sample MV precision indefinitely or until a defined event triggers a switch back to fractional-sample MV precision, at least temporarily. The event can be, for example, encoding of a particular number of units (e.g., 100 units). Or, the event can be a scene change. Or, the event can be a determination, based on statistics collected while encoding, that a switch back to fractional-sample MV precision is likely to be beneficial. (Such statistics can be collected during encoding of some limited amount area, to decide whether fractional-sample MV precision would have worked better for that area, then applied to switch MV precision for one or more units.)

Whether video content is natural video content or artificially-created video content, large portions of the video may be still. For example, the still portions could be stationary background in natural video or stationary content in screen capture content. Still portions of video have zero-value MVs, which have fractional parts of zero when MV precision is a fractional-sample MV precision. The presence of a significant number of zero-value MVs can confound decision logic that considers the fraction of MV values with non-zero fractional parts.

Figure 10:
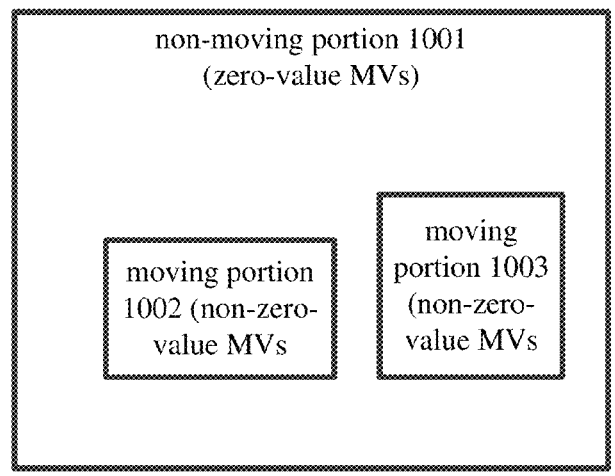
FIG. 10 is a diagram illustrating different regions of a picture according to some variations of the low-complexity approach.

Therefore, the encoder can eliminate zero-value MVs from consideration. FIG. 10 shows a picture (1000) that includes a non-moving portion (1001) with (mostly) zero value MVs and two moving portions (1002, 1003) with (mostly) non-zero-value MVs. The encoder considers the non-zero-value MVs in the moving portions (1002, 1003), but does not consider the MV values of the non-moving portion (1001). The encoder can switch to integer-sample MV precision when the fraction of non-zero-value MVs (in the moving portions (1002, 1003)) with fractional parts of zero exceeds a threshold (or when the fraction of the picture that uses non-zero MVs with fractional parts of zero (in terms of area) exceeds a threshold).

The encoder can also check that the number of non-zero-value MVs that is evaluated exceeds a threshold amount, so that decisions are not made based on an insignificant number of MV values. This can make the decision-making process more robust.

In another example implementation, the encoder encodes a given unit of video (e.g., picture, tile, slice or CU) using ¼-sample MV precision. The encoder switches to integer-sample MV precision for one or more subsequent units of the video if (1) more than x % of the unit uses inter-picture prediction with non-zero-value MVs, and (2) more than y % of the part of the unit that uses non-zero MVs has integer-value MVs (fractional parts of zero). The values of x and y depend on implementation and can be, for example, 5 and 75, respectively.

In a similar example implementation, the encoder encodes a given unit of video (e.g., picture, tile, slice or CU) using ¼-sample MV precision. The encoder switches to integer-sample MV precision for one or more subsequent units of the video if (1) more than z PUs of the unit have non-zero-value MVs, and (2) more than y % of those PUs have integer-value MVs (fractional parts of zero). The values of z and y depend on implementation and can be, for example, 100 and 75, respectively.

MV values for larger regions may be more reliable than MV values for smaller regions. The encoder can limit which MV values are evaluated. For example, the encoder can evaluate only MV values for blocks of a certain block size or larger (e.g., 16×16 or larger).

In another example implementation, the encoder encodes a given unit of video (e.g., picture, tile, slice or CU) using ¼-sample MV precision. The encoder switches to integer-sample MV precision for one or more subsequent units of the video if (1) more than z PUs of the unit are w×w or larger and have non-zero-value MVs, and (2) more than y % of those PUs have integer-value MVs (fractional parts of zero). The values of w, z and y depend on implementation and can be, for example, 16, 100 and 75, respectively.

5. Non-Normative Approaches.

In most of the preceding examples, an encoder signals one or more syntax elements indicating a selected MV precision in encoded data, e.g., in the bitstream. A decoder parses the syntax element(s) indicating the selected MV precision and interprets MV values according to the selected MV precision.

Alternatively, in a non-normative approach, the encoder does not signal any syntax elements indicating the MV precision selected by the encoder. For example, the encoder selects between integer-sample MV precision and a fractional-sample MV precision, but always encodes MV values at the fractional-sample MV precision. A decoder reconstructs and applies MV values at the fractional-sample MV precision.

When it selects integer-sample MV precision, the encoder can simplify motion estimation by avoiding interpolation of sample values at fractional-sample offsets and by evaluating candidate prediction regions only at integer-sample offsets. Also, if MV prediction produces a fractional value—e.g., using temporal MV prediction—the encoder can consider only those MV differences that would result in integer values when adding the MV difference to the fractional-valued MV prediction (e.g., from the temporal MV prediction). During decoding, motion compensation can be simplified by avoiding interpolation of sample values at fractional-sample offsets.

Certain approaches described in the preceding section (e.g., using a scaled rate-distortion cost by scaling distortion cost and/or bit rate cost, or adding a distortion cost penalty or bit rate cost penalty, or adjusting the weight factor) can also be adapted for a non-normative approach. The encoder can vary the extent of bias towards or against integer-sample MV precision during encoding. Through the scaling, penalties and/or weight factor, the encoder can adjust bias towards integer-sample MV precision depending on a degree of confidence that integer-sample MV values are likely to be more appropriate for encoding the video content, or depending on computational capacity for encoding or decoding.

6. Alternatives and Variations.

In some usage scenarios, the encoding order of pictures (also called decoding order or decoded order) differs from the temporal order at input/camera-capture and display (also called display order). The encoder can take such reordering into account when selecting MV precision. For example, the encoder can select MV precision(s) based on the temporal order of pictures rather than on the encoding order of the pictures.

In many of the examples described herein, intra BC prediction and motion compensation are implemented in separate components or processes, and BV estimation and motion estimation are implemented in separate components or processes. Alternatively, intra BC prediction can be implemented as a special case of motion compensation, and BV estimation can be implemented as a special case of motion estimation, for which the current picture is used as a reference picture. In such implementations, a BV value can be signaled as an MV value but used for intra BC prediction (within the current picture) rather than inter-picture prediction. As the term is used herein, "intra BC prediction" indicates prediction within a current picture, whether that prediction is provided using an intra-picture prediction module, a motion compensation module, or some other module. Similarly, a BV value can be represented using an MV value or using a distinct type of parameter or syntax element, and BV estimation can be provided using an intra-picture estimation module, motion estimation module or some other module. The approaches described herein for selecting MV precision can be applied to determine the precision of MV values that will be used as BV values for intra BC prediction (that is, with the current picture as reference picture).

VI. Innovative Features.

In addition to the claims presented below, innovative features described herein include but are not limited to the following.

| # | Feature |
|---|---------|
| A1 | A computing device comprising:<br>means for encoding video, including means for determining a motion vector ("MV") precision for a unit of the video, wherein MV values for blocks within the unit of the video have the MV precision for the unit, and wherein the means for determining the MV precision for the unit includes:<br>means for identifying a set of MV values having a fractional-sample MV precision; and<br>means for selecting the MV precision for the unit based at least in part on prevalence, within the set of MV values, of MV values having a fractional part of zero; and<br>means for outputting the encoded video. |
| B1 | A computing device comprising:<br>means for encoding video, including means for determining a motion vector ("MV") precision for a unit of the video, wherein MV values for blocks within the unit of the video have the MV precision for the unit, wherein the means for determining includes means for performing rate-distortion analysis to decide between multiple MV precisions, the multiple MV precisions including one or more fractional-sample MV precisions and integer-sample MV precision, and wherein the rate-distortion analysis is biased towards the integer-sample MV precision by: (a) scaling a distortion cost, (b) adding a penalty to the distortion cost, (c) scaling a bit rate cost, (d) adding a penalty to the bit rate cost, and/or (e) adjusting a Lagrangian multiplier factor; and<br>means for outputting the encoded video |
| C1 | A computing device comprising:<br>means for encoding video, including means for determining a motion vector ("MV") precision for a unit of the video from among multiple MV precisions, the multiple MV precisions including one or more fractional-sample MV precisions and integer-sample MV precision, wherein MV values for blocks within the unit of the video have the MV precision for the unit, and wherein the means for determining includes:<br>means for collecting information about the video; and<br>means for selecting the MV precision for the unit based at least in part on the collected information; and<br>means for outputting the encoded video. |

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more computer-readable media storing computer-executable instructions for causing a computing device, when programmed thereby, to perform operations, the one or more computer-readable media being selected from the group consisting of non-volatile memory, magnetic disk, CD-ROM, and DVD, the operations comprising: encoding video, including determining a motion vector ("MV") precision for a unit of the video, wherein MV values for blocks within the unit of the video have the MV precision for the unit, and wherein the determining the MV precision for the unit includes:
identifying a set of MV values having a fractional-sample MV precision;
measuring prevalence, within the set of MV values, of MV values having a fractional part of zero;
comparing the measure of prevalence to a threshold; and
selecting the MV precision for the unit based at least in part on results of the comparison; and
outputting the encoded video.

2. The one or more computer-readable media of claim 1 wherein:
the measure of prevalence is the fraction of the set of MV values having a fractional part of zero; or
a region or set of regions uses the set of MV values, and the measure of prevalence is the fraction of the region or the set of regions that uses one of the MV values having a fractional part of zero.

3. The one or more computer-readable media of claim 2 wherein, if the measure of prevalence exceeds the threshold, the selected MV precision for the unit is integer-sample MV precision, and wherein, if the measure of prevalence does not exceed the threshold, the selected MV precision for the unit is the fractional-sample MV precision.

4. The one or more computer-readable media of claim 1 wherein the selected MV precision for the unit is integer-sample MV precision, wherein the selected MV precision for the unit is also used for subsequent units of the video until an event causes a switch back to the fractional-sample MV precision, and wherein the event is:

encoding of a defined number of units;
a scene change; or
a determination, based on observations during encoding, that switching back to the fractional-sample MV precision would be beneficial.

5. The one or more computer-readable media of claim 1 wherein the set of MV values is:
allowed to include zero-value MVs and non-zero-value MVs;
constrained to include only non-zero-value MVs; or
constrained to include only non-zero-value MVs from blocks of a certain block size or larger.

6. The one or more computer-readable media of claim 1 wherein the selecting the MV precision for the unit is also based at least in part on a measure of prevalence of non-zero-value MVs, such that switching to integer-sample MV precision is permitted if there are a threshold amount of non-zero-value MVs, wherein the measure of prevalence of non-zero-value MVs is (a) the fraction of MV values that are non-zero-value MVs, (b) count of blocks that use non-zero-value MVs, or (c) the fraction of a region or set of regions that uses non-zero value MVs, and wherein the set of MV values having a fractional-sample MV precision is identified from among non-zero value MVs of the region or set of regions.

7. The one or more computer-readable media of claim 1 wherein the unit of the video is a current unit of the video, and wherein:
the encoding is single-pass encoding, and the selected MV precision for the current unit depends at least in part on one or more previous units of the video; or
the encoding is multi-pass encoding, and the selected MV precision for the current unit depends at least in part on the current unit of the video.

8. The one or more computer-readable media of claim 1 wherein the operations further comprise:
adjusting amount of bias towards or against integer-sample MV precision based at least in part on (a) a degree of confidence that integer-sample MV precision is appropriate and/or (b) computational capacity of encoding and/or decoding.

9. The one or more computer-readable media of claim 1 wherein the selected MV precision for the unit is for horizontal MV components and/or vertical MV components of the MV values for blocks within the unit of the video.

10. The one or more computer-readable media of claim 1 wherein the unit is selected from the group consisting of sequence, series of pictures between scene changes, group of pictures, picture, tile, slice coding tree unit, and coding unit, and wherein the blocks are prediction blocks, prediction units, macroblocks or sub-macroblock partitions.

11. A computing device comprising:
one or more processing units;
volatile memory; and
non-volatile memory and/or storage, the non-volatile memory and/or storage having stored therein computer-executable instructions for causing the computing device, when programmed thereby, to perform operations comprising:
with a video encoder, encoding video, including determining a motion vector ("MV") precision for a unit of the video from among multiple MV precisions, the multiple MV precisions including one or more fractional-sample MV precisions and integer-sample MV precision, wherein MV values for blocks within the unit of the video have the MV precision for the unit, and wherein the determining includes:
collecting information about the video, wherein the collected information includes a set of MV values at one of the one or more fractional-sample MV precisions;
measuring prevalence, within the set of MV values, of MV values having a fractional part of zero;
comparing the measure of prevalence to a threshold; and
selecting the MV precision for the unit based at least in part on results of the comparison; and
storing, in a buffer, the encoded video for output.

12. The computing device of claim 11 wherein the collected MV values are organized according to value of their fractional parts.

13. The computing device of claim 11, wherein the unit of the video is a current unit of the video, and wherein:
the encoding is single-pass encoding, and the selected MV precision for the current unit depends at least in part on one or more previous units of the video; or
the encoding is multi-pass encoding, and the selected MV precision for the current unit depends at least in part on the current unit of the video.

14. The computing device of claim 11 wherein the encoding further comprises:
adjusting amount of bias towards or against integer-sample MV precision based at least in part on (a) a degree of confidence that integer-sample MV precision is appropriate and/or (b) computational capacity of encoding and/or decoding.

15. The computing device of claim 11 wherein the selected MV precision for the unit is for horizontal MV components and/or vertical MV components of the MV values for blocks within the unit of the video.

16. The computing device of claim 11 wherein the unit is selected from the group consisting of sequence, series of pictures between scene changes, group of pictures, picture, tile, slice coding tree unit, and coding unit, and wherein the blocks are prediction blocks, prediction units, macroblocks or sub-macroblock partitions.

17. In a computing device, a method comprising:
encoding video, including determining a motion vector ("MV") precision for a unit of the video, wherein MV values for blocks within the unit of the video have the MV precision for the unit, and wherein the determining the MV precision for the unit includes:
identifying a set of MV values having a fractional-sample MV precision;
measuring prevalence, within the set of MV values, of MV values having a fractional part of zero;
comparing the measure of prevalence to a threshold; and
selecting the MV precision for the unit based at least in part on results of the comparison; and
outputting the encoded video.

18. The method of claim 17 wherein:
the measure of prevalence is the fraction of the set of MV values having a fractional part of zero; or
a region or set of regions uses the set of MV values, and the measure of prevalence is the fraction of the region or the set of regions that uses one of the MV values having a fractional part of zero.

19. The method of claim 17 wherein, if the measure of prevalence exceeds the threshold, the selected MV precision for the unit is integer-sample MV precision, and wherein, if the measure of prevalence does not exceed the threshold, the selected MV precision for the unit is the fractional-sample MV precision.

20. The method of claim 17 wherein the selected MV precision for the unit is integer-sample MV precision, wherein the selected MV precision for the unit is also used for subsequent units of the video until an event causes a switch back to the fractional-sample MV precision, and wherein the event is:
- encoding of a defined number of units;
- a scene change; or
- a determination, based on observations during encoding, that switching back to the fractional-sample MV precision would be beneficial.

* * * * *